(12) United States Patent
Bingham et al.

(10) Patent No.: US 9,592,608 B1
(45) Date of Patent: Mar. 14, 2017

(54) METHODS AND SYSTEMS FOR PROVIDING FEEDBACK DURING TEACH MODE

(71) Applicant: X Development LLC, Mountain View, CA (US)

(72) Inventors: Jeffrey Thomas Bingham, San Francisco, CA (US); Rob Wilson, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 14/570,183

(22) Filed: Dec. 15, 2014

(51) Int. Cl.
*B25J 9/22* (2006.01)
*B25J 9/16* (2006.01)
*B25J 9/00* (2006.01)

(52) U.S. Cl.
CPC ........... *B25J 9/1674* (2013.01); *B25J 9/0081* (2013.01); *Y10S 901/04* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,641,251 A * | 2/1987 | Inoue | ..................... | B25J 9/0081 180/8.6 |
| 4,761,595 A * | 8/1988 | Goor | ..................... | G05B 19/19 318/567 |
| 4,791,588 A * | 12/1988 | Onda | ................... | G05B 19/423 700/260 |
| 5,056,038 A * | 10/1991 | Kuno | ..................... | B25J 9/1633 700/260 |
| 5,691,898 A * | 11/1997 | Rosenberg | ............ | A63F 13/285 345/161 |
| 6,212,443 B1 * | 4/2001 | Nagata | ................. | G05B 19/423 318/568.13 |

(Continued)

FOREIGN PATENT DOCUMENTS

WO 2011153569 A1 12/2011

OTHER PUBLICATIONS

Leonel Rozo et al., Robot Learning from Demonstration in the Force Domain; http://www.iri.upc.edu/files/scidoc/1235-Robot-Learning-from-Demonstration-in-the-Force-Domain.pdf, 2011, 6 pages, CSIC-UPC, Barcelona, ES.

*Primary Examiner* — Jonathan L Sample
(74) *Attorney, Agent, or Firm* — McDonnell Boehnen; Hulbert & Berghoff LLP

(57) ABSTRACT

Example implementations may relate to a robotic system that provides feedback. The robotic system is configured to receive information related to a path in an environment of the robotic system. The robotic system is also configured to initiate a recording process for storing data related to motion of a component in the environment. The robotic system is additionally configured to detect, during the recording process, movement of the component along the path in the environment, where the movement results from application of an external force to the robotic system. The robotic system is further configured to determine, during the recording process, deviation of the movement away from the path by at least a threshold amount and responsively provide feedback including one or more of (i) resisting the deviation of the movement away from the path and (ii) guiding the at least one component back towards the path.

20 Claims, 14 Drawing Sheets

(56) References Cited

U.S. PATENT DOCUMENTS

| | | | | |
|---|---|---|---|---|
| 7,881,824 B2* | 2/2011 | Nagasaka | B25J 13/085 | 700/245 |
| 7,952,483 B2* | 5/2011 | Ferguson | A63F 13/211 | 340/13.2 |
| 8,761,926 B2* | 6/2014 | Zaier | B62D 57/032 | 700/1 |
| 9,186,795 B1* | 11/2015 | Edsinger | B25J 9/1694 | |
| 9,221,117 B2* | 12/2015 | Conrardy | B23K 37/04 | |
| 2003/0025473 A1* | 2/2003 | Nagata | B25J 9/163 | 318/568.18 |
| 2003/0144764 A1* | 7/2003 | Yokono | G06N 3/008 | 700/245 |
| 2004/0254771 A1* | 12/2004 | Riener | G09B 23/32 | 703/7 |
| 2005/0004734 A1* | 1/2005 | Cripps | E02F 9/2029 | 701/50 |
| 2005/0222714 A1* | 10/2005 | Nihei | G05B 19/423 | 700/264 |
| 2006/0293617 A1* | 12/2006 | Einav | A61H 1/0274 | 601/33 |
| 2007/0067678 A1* | 3/2007 | Hosek | G05B 23/0235 | 714/25 |
| 2007/0152619 A1* | 7/2007 | Sugiyama | B25J 9/1612 | 318/568.12 |
| 2007/0282228 A1* | 12/2007 | Einav | A61B 5/7475 | 601/33 |
| 2010/0152896 A1* | 6/2010 | Komatsu | B25J 9/0003 | 700/258 |
| 2010/0286822 A1* | 11/2010 | Zaier | B62D 57/032 | 700/245 |
| 2010/0312392 A1* | 12/2010 | Zimmermann | G05B 19/423 | 700/258 |
| 2011/0093120 A1* | 4/2011 | Ando | B25J 9/1638 | 700/260 |
| 2011/0106311 A1* | 5/2011 | Nakajima | B25J 9/1697 | 700/253 |
| 2011/0208355 A1* | 8/2011 | Tsusaka | B25J 9/1664 | 700/246 |
| 2011/0301756 A1* | 12/2011 | Yoshiike | B62D 57/032 | 700/253 |
| 2012/0143371 A1* | 6/2012 | Selnes | G05B 19/423 | 700/254 |
| 2012/0239193 A1* | 9/2012 | Mizutani | G05B 19/423 | 700/250 |
| 2013/0116706 A1* | 5/2013 | Lee | A61B 19/2203 | 606/130 |
| 2013/0178980 A1* | 7/2013 | Chemouny | B25J 9/1671 | 700/255 |
| 2013/0226346 A1* | 8/2013 | Dreslinski | B25J 9/1674 | 700/264 |
| 2013/0310977 A1* | 11/2013 | Tsusaka | B25J 9/1656 | 700/257 |
| 2013/0343640 A1* | 12/2013 | Buehler | B25J 9/0087 | 382/155 |
| 2013/0345873 A1* | 12/2013 | Blumberg | B25J 9/0087 | 700/259 |
| 2014/0201571 A1* | 7/2014 | Hosek | G06F 11/2257 | 714/26 |
| 2014/0277725 A1* | 9/2014 | Kouno | B25J 9/1676 | 700/255 |
| 2014/0320629 A1* | 10/2014 | Chizeck | G06F 3/016 | 348/81 |
| 2015/0025684 A1* | 1/2015 | Negishi | B25J 9/1664 | 700/261 |
| 2015/0088309 A1* | 3/2015 | Doll | B25J 9/163 | 700/245 |
| 2015/0105907 A1* | 4/2015 | Aiso | B25J 9/1697 | 700/259 |
| 2015/0120055 A1* | 4/2015 | Miyazawa | B25J 9/1697 | 700/259 |
| 2015/0127151 A1* | 5/2015 | Riedel | B25J 9/1643 | 700/250 |
| 2015/0250547 A1* | 9/2015 | Fukushima | G05B 15/02 | 606/130 |
| 2015/0258679 A1* | 9/2015 | Izhikevich | B25J 9/0081 | 700/250 |
| 2015/0258682 A1* | 9/2015 | Izikevich | B25J 9/0009 | 700/245 |
| 2015/0258683 A1* | 9/2015 | Izhikevich | B25J 9/163 | 700/250 |
| 2015/0342695 A1* | 12/2015 | He | G01L 5/166 | 606/130 |

\* cited by examiner

METHODS AND SYSTEMS FOR PROVIDING FEEDBACK DURING TEACH MODE

BACKGROUND

Robotic systems may be used for applications involving material handling, welding, assembly, and dispensing, among others. Over time, the manner in which these robotic systems operate is becoming more intelligent, more efficient, and more intuitive. As robotic systems become increasingly prevalent in numerous aspects of modern life, the need for robotic systems capable of working alongside humans becomes apparent. Therefore, a demand for such robotic systems has helped open up a field of innovation in actuators, sensing techniques, as well as component design and assembly.

SUMMARY

Example implementations may relate to a robotic system that is configured to provide feedback, such as haptic feedback in one example, during teach mode. During teach mode, the robotic system records various movements based on external forces provided by a user for the purpose of teaching the robotic system how to carry out a task. This feedback may be used to specify various physical limitations of the robotic system and may assist the user to stay within certain constraints as the user instructs the robotic system regarding a specific task.

In one aspect, a method is provided. The method involves receiving, by a robotic system including at least one component, information related to a path in an environment of the robotic system. The method also involves initiating, by the robotic system, a recording process for storing data related to motion of the at least one component in the environment. The method additionally involves detecting, during the recording process, movement of the at least one component along the path in the environment of the robotic system, where the movement results from application of an external force to the robotic system. The method further involves determining, during the recording process, deviation of the movement away from the path by at least a threshold amount and responsively providing feedback related to the deviation.

In another aspect, a non-transitory computer readable medium is provided. The non-transitory computer readable medium has stored therein instructions executable by one or more processors to cause a robotic system to perform functions, the robotic system including a plurality of components. The functions include receiving information related to a path in an environment of the robotic system. The functions also include initiating a recording process for storing data related to motion of the plurality of components in the environment. The functions additionally include detecting, during the recording process, movement of at least one component, from the plurality of components, along the path in the environment of the robotic system, where the movement results from application of an external force to the robotic system. The functions further include determining, during the recording process, deviation of the movement away from the path by at least a threshold amount and responsively providing feedback including guiding the at least one component back towards the path.

In yet another aspect, a robotic device is provided. The robotic device includes at least one component. The robotic device additionally includes a controller. The controller is configured to receive information related to a path in an environment of the robotic device. The controller is also configured to initiate a recording process for storing data related to motion of the at least one component in the environment. The controller is additionally configured to detect, during the recording process, movement of the at least one component along the path in the environment of the robotic device, where the movement results from application of an external force to the at least one component. The controller is further configured to determine, during the recording process, deviation of the movement away from the path by an amount that exceeds a threshold amount. The controller is yet further configured to, in response to determining deviation of the movement away from the path by an amount that exceeds a threshold amount, providing feedback including resisting the deviation of the movement away from the path.

In yet another aspect, another system is provided. The system may include means for receiving information related to a path in an environment of the robotic system. The system may also include means for initiating a recording process for storing data related to motion of a plurality of components, of the robotic system, in the environment. The system may additionally include means for detecting, during the recording process, movement of at least one component, from the plurality of components, along the path in the environment of the robotic system, where the movement results from application of an external force to the robotic system. The system may further include means for determining, during the recording process, deviation of the movement away from the path by at least a threshold amount and responsively providing feedback including one or more of (i) resisting the deviation of the movement away from the path and (ii) guiding the at least one component back towards the path.

These as well as other aspects, advantages, and alternatives will become apparent to those of ordinary skill in the art by reading the following detailed description, with reference where appropriate to the accompanying drawings.

DETAILED DESCRIPTION

Example methods and systems are described herein. It should be understood that the words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. OVERVIEW

According to various implementations, described herein are methods and systems for providing haptic feedback, by a robotic system, during teach mode. In particular, teach mode may be an operating mode of the robotic system that allows a user to physically interact with and guide the robotic system towards carrying out and recording various movements. The robotic system may thus obtain information regarding how to carry out a specific task based on instructions and guidance from the user.

Providing feedback to a user during teach mode may take on various forms such as providing visual feedback, audio feedback, vibrational feedback, or resistance to movement, among others. This feedback may specify various physical limitations of the robotic system. In some cases, the limitations may correspond to limitations of the robotic system when the robotic system operates independently, such as a limit to an amount of torque that an actuator of the robotic system can generate during independent operation. As a result, by specifying the limitations, the feedback may encourage the user to refrain from teaching movements that exceed the limitations and the robotic system may then carry out the recorded movement during independent operation while staying away from the physical limitations.

Additionally or alternatively, this feedback may assist the user to stay within certain constraints as the user instructs the robotic system regarding a specific task. For example, the user may select or construct a template, via a computing system, corresponding to a path in the physical work space of the robotic system. Given the path, the robotic system may provide feedback, during teach mode, to encourage the user to maintain movement of a component of the robotic system (e.g., end effector) along the path or in the vicinity of the path.

II. EXAMPLE ROBOTIC SYSTEM

Figure 1:
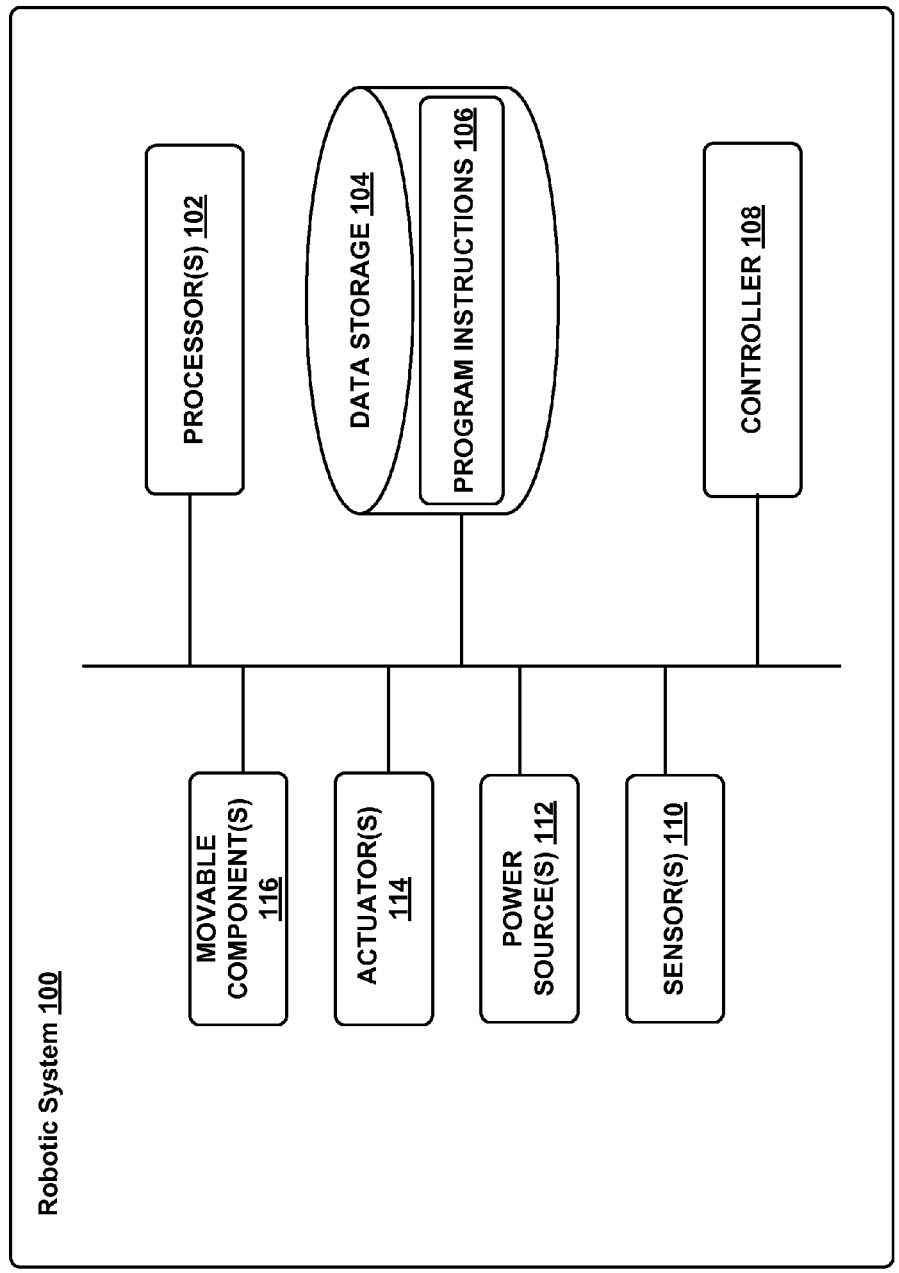
FIG. 1 illustrates an example configuration of a robotic system, according to an example implementation.

Referring now to the figures, FIG. 1 shows an example configuration of a robotic system 100. The robotic system 100 may be a robotic arm, a humanoid robot, or a quadrupedal robot, among other examples. Additionally, the robotic system 100 may also be referred to as a robotic device, robotic manipulator, or robot, among others.

The robotic system 100 is shown to include processor(s) 102, data storage 104, program instructions 106, controller 108, sensor(s) 110, power source(s) 112, actuator(s) 114, and movable component(s) 116. Note that the robotic system 100 is shown for illustration purposes only as robotic system 100 may include additional components and/or have one or more components removed without departing from the scope of the invention. Further, note that the various components of robotic system 100 may be connected in any manner.

Processor(s) 102 may be a general-purpose processor or a special purpose processor (e.g., digital signal processors, application specific integrated circuits, etc.). The processor (s) 102 can be configured to execute computer-readable program instructions 106 that are stored in the data storage 104 and are executable to provide the functionality of the robotic system 100 described herein. For instance, the program instructions 106 may be executable to provide functionality of controller 108, where the controller 108 may be configured to instruct an actuator 114 to cause movement of one or more movable component(s) 116.

The data storage 104 may include or take the form of one or more computer-readable storage media that can be read or accessed by processor(s) 102. The one or more computer-readable storage media can include volatile and/or non-volatile storage components, such as optical, magnetic, organic or other memory or disc storage, which can be integrated in whole or in part with processor(s) 102. In some embodiments, the data storage 104 can be implemented using a single physical device (e.g., one optical, magnetic, organic or other memory or disc storage unit), while in other embodiments, the data storage 104 can be implemented using two or more physical devices. Further, in addition to the computer-readable program instructions 106, the data storage 104 may include additional data such as diagnostic data, among other possibilities.

The robotic system 100 may include one or more sensor (s) 110 such as force sensors, proximity sensors, motion sensors, load sensors, position sensors, touch sensors, depth sensors, ultrasonic range sensors, and infrared sensors, among other possibilities. The sensor(s) 110 may provide sensor data to the processor(s) 102 to allow for appropriate interaction of the robotic system 100 with the environment. Additionally, the sensor data may be used in evaluation of various factors for providing feedback as further discussed below. Further, the robotic system 100 may also include one or more power source(s) 112 configured to supply power to various components of the robotic system 100. Any type of power source may be used such as, for example, a gasoline engine or a battery.

The robotic system 100 may also include one or more actuator(s) 114. An actuator is a mechanism that may be used to introduce mechanical motion. In particular, an actuator may be configured to convert stored energy into movement of one or more components. Various mechanisms may be used to power an actuator. For instance, actuators may be powered by chemicals, compressed air, or electricity, among other possibilities. In some cases, an actuator may be a rotary actuator that may be used in systems involving rotational forms of motion (e.g., a joint in the robotic system 100). In other cases, an actuator may be a linear actuator that may be used in systems involving straight line motion.

In either case, actuator(s) 114 may cause movement of various movable component(s) 116 of the robotic system 100. The moveable component(s) 116 may include appendages such as robotic arms, legs, and/or hands, among others. The moveable component(s) 116 may also include a movable base, wheels, and/or end effectors, among others.

In some implementations, a computing system (not shown) may be coupled to the robotic system 100 and may be configured to receive input from a user, such as via a graphical user interface. This computing system may be incorporated within the robotic system 100 or may be an external computing system that is capable of (wired or wireless) communication with the robotic system 100. As such, the robotic system 100 may receive information and instructions, such as based on user-input at the graphical user interface and/or based on user-input received via press of buttons (or tactile input) on the robotic system 100, among other possibilities.

Figure 2A:
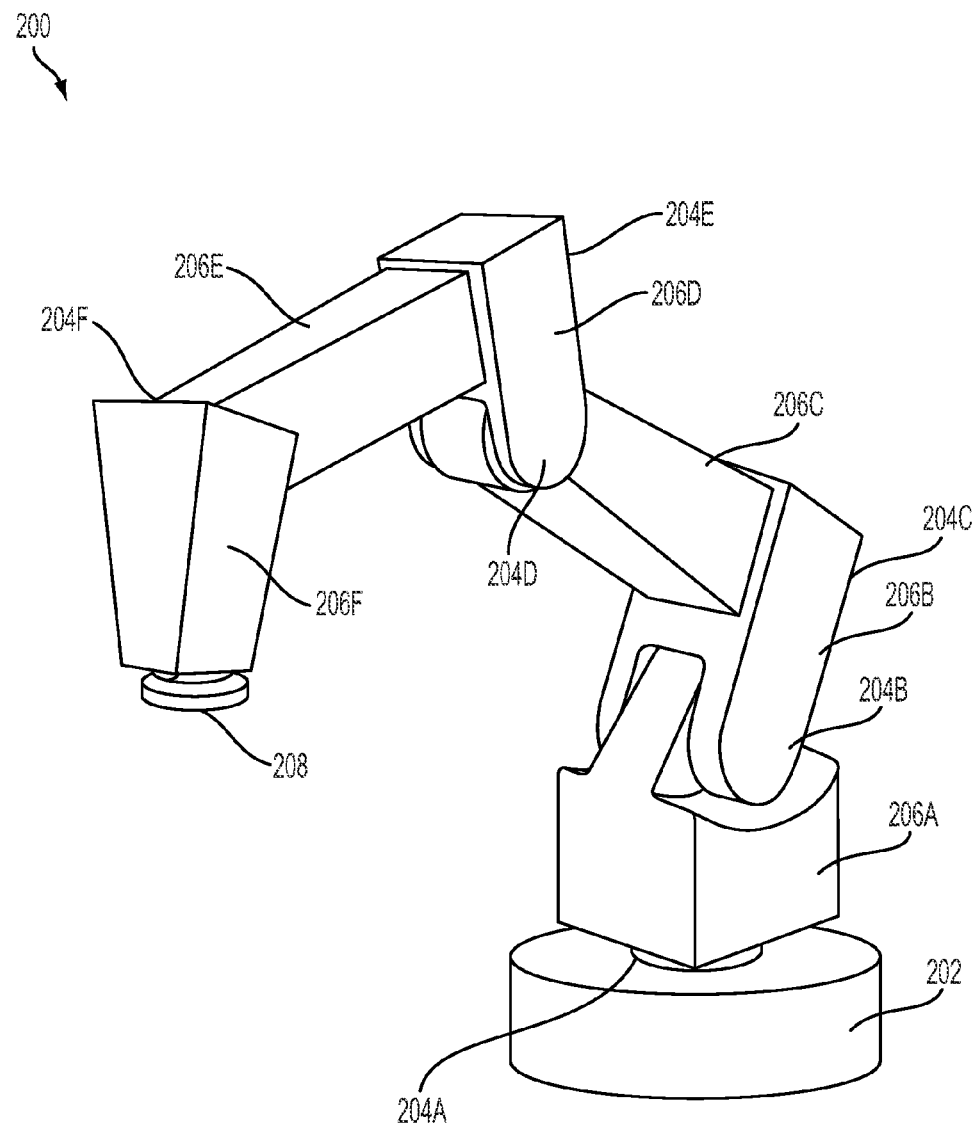
FIG. 2A illustrates an example robotic arm, according to an example implementation.
Figure 2B:
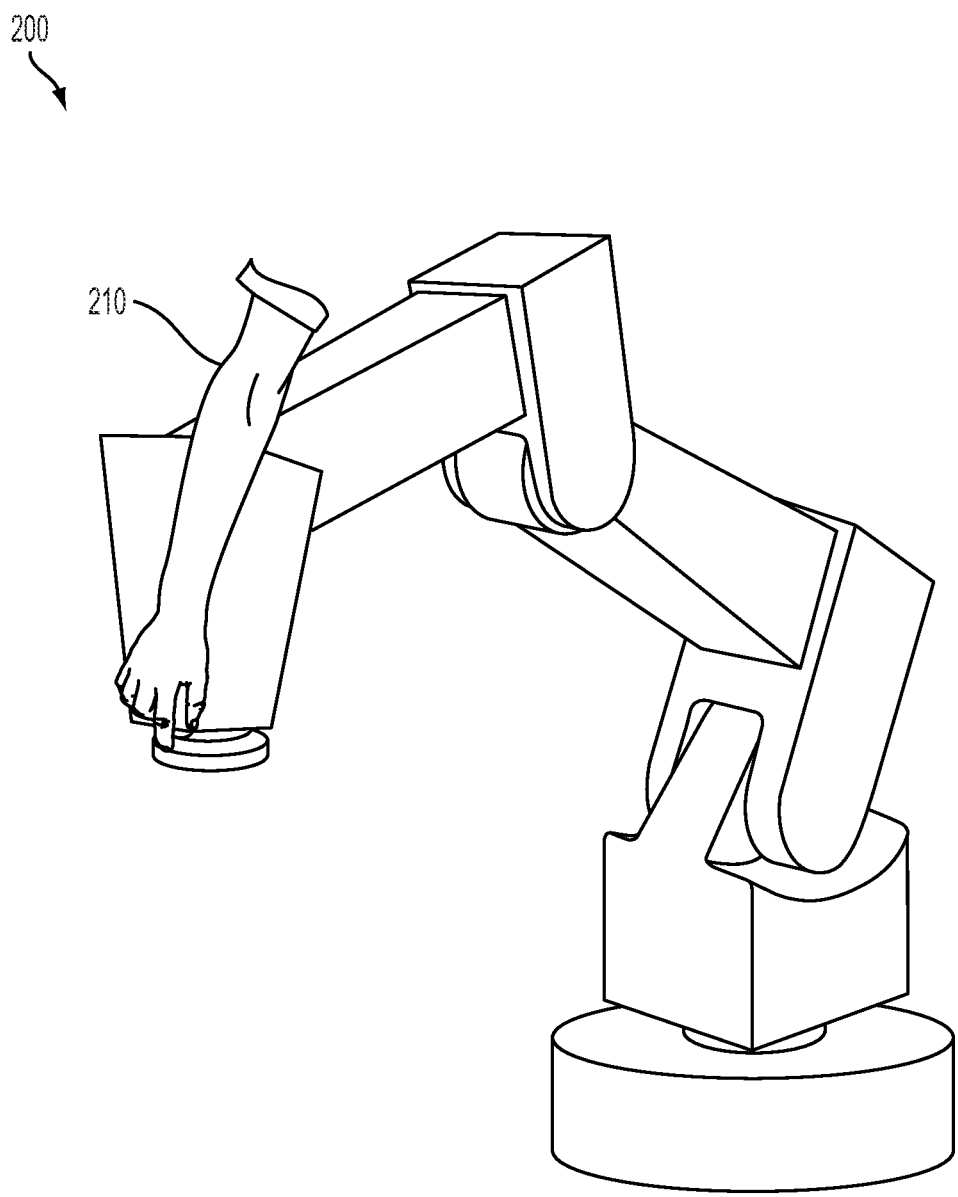
FIG. 2B illustrates operation of the robotic arm during teach mode, according to an example implementation.

A robotic system 100 may take on various forms. To illustrate, refer to FIGS. 2A-2B showing an example robotic arm 200. As shown, the robotic arm 200 includes a base 202, which may be a stationary base or may be a movable base. In the case of a movable base, the base 202 may be considered as one of the movable component(s) 116 and may include wheels (not shown), powered by one or more of the actuator(s) 114, which allow for mobility of the entire robotic arm 200.

Additionally, the robotic arm 200 includes joints 204A-204F each coupled to one or more of the actuator(s) 114. The actuators in joints 204A-204F may operate to cause movement of various movable component(s) 116 such as appendages 206A-206F and/or end effector 208. For example, the actuator in joint 204F may cause movement of appendage 206F and end effector 208 (i.e., since end effector 208 is coupled to appendage 206F). Further, end effector 208 may take on various forms and may include various parts. In one example, end effector 208 may take the form of a gripper such as a finger gripper or a suction gripper. In another example, end effector 208 may take the form of a tool such as a drill or a brush. In yet another example, the end effector may include sensors such as force sensors, location sensors, and/or proximity sensors. Other examples may also be possible.

In an example implementation, a robotic system 100, such as robotic arm 200, may be capable of operating in a teach mode as illustrated by FIG. 2B. In particular, teach mode may be an operating mode of the robotic arm 200 that allows a user 210 (shown as a human arm for illustration purposes only) to physically interact with and guide the robotic arm 200 towards carrying out and recording various movements. In a teaching mode, an external force is applied (e.g., by the user) to the robotic system 100 based on a teaching input that is intended to teach the robotic system regarding how to carry out a specific task. The robotic arm 200 may thus obtain data regarding how to carry out the specific task based on instructions and guidance from the user 210. Such data may relate to a plurality of configurations of the movable component(s) 116, joint position data, velocity data, acceleration data, torque data, force data, and power data, among other possibilities.

For example, during teach mode the user 210 may grasp onto any part of the robotic arm 200 and provide an external force by physically moving the robotic arm 200. In particular, the user 210 may guide the robotic arm 200 towards grasping onto an object and then moving the object from a first location to a second location. As the user 210 guides the robotic arm 200 during teach mode, the system may obtain and record data related to the movement such that the robotic arm 200 may be configured to independently carry out the task at a future time during independent operation (e.g., when the robotic arm 200 operates independently outside of teach mode). Note, however, that external forces may also be applied by other entities in the physical workspace such as by other objects, machines, and/or robotic systems, among other possibilities.

III. EXAMPLE HAPTIC FEEDBACK

Disclosed herein are various implementations for the robotic system 100 to provide feedback to the user 210 during teach mode. This feedback may specify various physical limitations of the robotic system 100. As such, the feedback can be used to encourage certain types of movements of the movable component(s) 106 while discouraging other types movements of the movable component(s) 106, such as movements exceeding physical limitations of the robotic system 100.

In one case, feedback may be in the form of resistance to movement of one or more moveable component(s) 106. For instance, an actuator that is coupled to a moveable component may apply a torque to counteract movement of the movable component. In another case, feedback may be in the form of vibration that can be felt by the user 210, such as at a location at which the user 210 grabs onto the robotic system 100 during teach mode. This vibration may be generated by one or more of the actuator(s) 114. Additionally or alternatively, the system may include other vibration generating devices such as separate motors and/or speakers, among others. Moreover, this vibrational feedback may be in the form of specific vibration intensities and/or specific vibrational patterns, among other possibilities. Other cases of feedback may involve generation of light (e.g., using Light Emitting Diodes (LEDs)), sound (e.g., using speakers), and images/video (e.g., using a display).

While specific forms of feedback have been discussed, other forms of feedback may also be possible without departing from the scope of the disclosure. In an example implementation, the system may provide such feedback in response to various factors as further discussed below.

In one example, the robotic system 100 provides feedback related to velocity (and/or acceleration) limits of the robotic system 100. More specifically, the robotic system 100 may have limitations as to the velocities (and/or accelerations) at which the robotic system 100 is capable of independently moving various movable component(s) 116 (e.g., appendages) of the system. A velocity (and/or acceleration) limit may involve a corresponding limit based on operation/characteristics of one or more of the actuator(s) 114. Alternatively, a velocity (and/or acceleration) limit may involve a corresponding limit based on movement of one or more of the movable component(s) 116, among others. In the case of movable component(s) 116, the limits may correspond to safety limits for safe interaction with the robotic system 100. Information related to such limits can be obtained by the robotic system 100 from data storage 104 and/or from a remote server, among others.

In this example, the robotic system 100 provides feedback to the user 210 at times, during teach mode, when user-instructed movements involve velocities (and/or accelerations) that exceed (or about to exceed) the limits. In particular, the robotic system 100 may determine velocities (and/or accelerations) of various parts of the system during the user-instructed movements (e.g., using one or more motion sensors). The robotic system 100 may then compare (e.g., continuously or from time-to-time) the determined velocities (and/or accelerations) to the limits of the corresponding parts.

In one case, the robotic system 100 may provide feedback in response to at least one determined velocity (and/or acceleration) being within a threshold of meeting the corresponding limit, such as when about to exceed the limit. In another case, the robotic system 100 may provide feedback in response to at least one determined velocity (and/or acceleration) exceeding the limit by any amount. In yet another case, the robotic system 100 may provide feedback in response to at least one determined velocity (and/or acceleration) exceeding the limit by at least a threshold amount. Other cases may also be possible.

In an example implementation, this feedback is in the form of resistance to such user-instructed movements. The amount of resistance may be constant regardless of the determined velocity (and/or acceleration). Alternatively, the amount of resistance may relate (e.g. be proportional) to kinematic variable such as (i) the determined values of velocity/acceleration or (ii) an amount that the determined values exceed the limits or the thresholds discussed above. This relationship may specifically involve mapping kinematic variables to response torques provided by one or more of the actuator(s) 114 in order to resist (and/or guide) user-instructed movements of one or more movable component(s) 116.

For instance, the robotic system 100 may be configured to provide feedback as if positioned in a "shear thickening fluid" environment. In particular, the robotic system 100 may provide more resistance to faster movements during teach mode, such as for movements exceeding (or about to exceed) a velocity limit, while providing less (or no) resistance to slower movements that stay away from the velocity limits or to movements that do not significantly exceed the velocity limits.

Figure 3A:
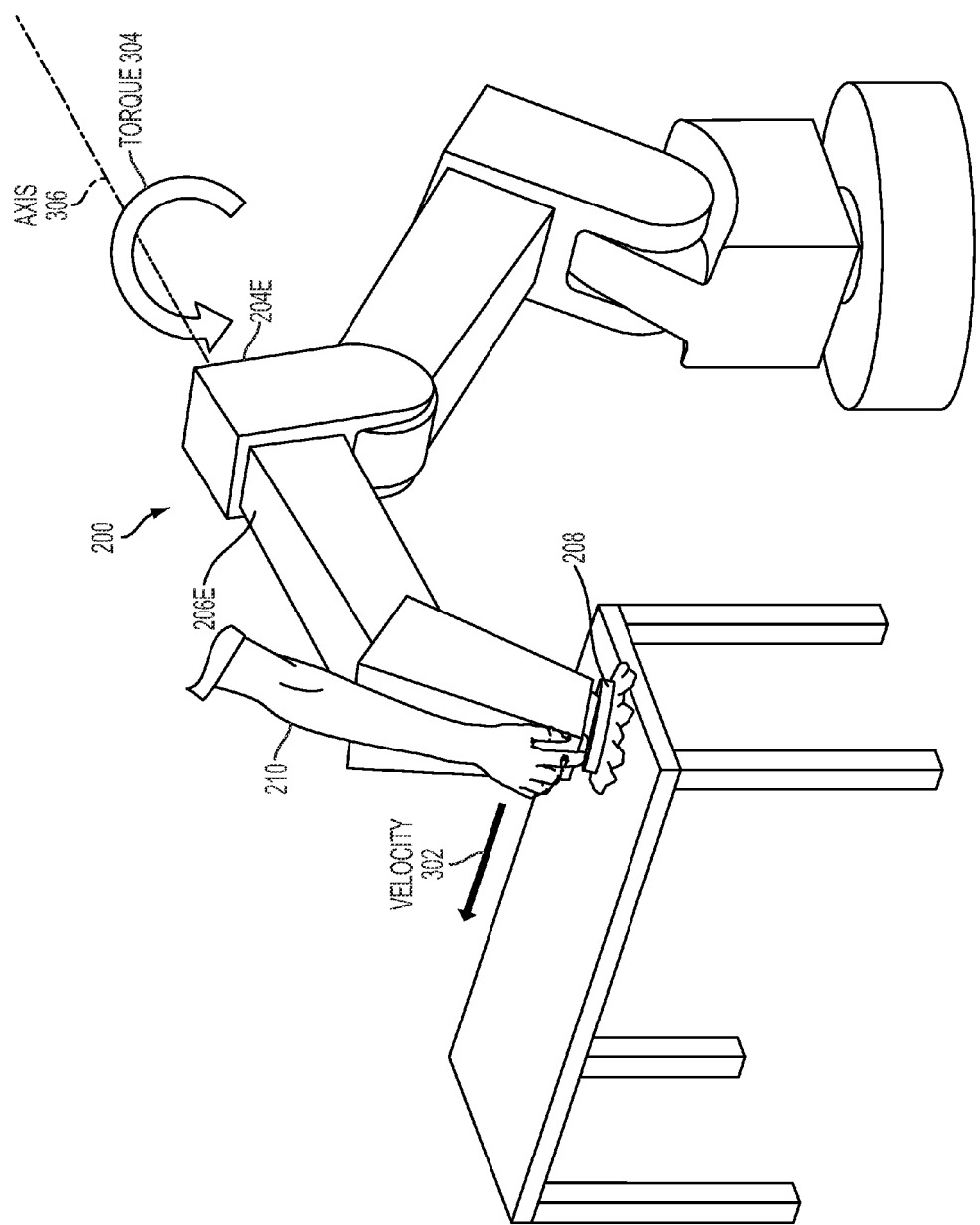
FIG. 3A illustrates first example feedback of the robotic arm during teach mode, according to an example implementation.

To illustrate, refer to FIG. 3A depicting an example scenario that involves the user 210 teaching the task of wiping a surface. This task may specifically involve moving the end effector 208 of the robotic arm 200 along the surface using various movements that involve specific velocities. In some cases, the user 210 may move the robotic arm 200 at a velocity that exceeds the corresponding velocity limit of at least one actuator in the robotic arm 200.

For example, user 210 is shown to move the robotic arm 200 at a velocity 302. In order to independently replicate this movement depicted in FIG. 3A, the robotic arm 200 may have to use an actuator in joint 204E in order to cause movement of appendage 206E among other movable component(s) 116. However, when the robotic arm 200 operates independently, the actuator in joint 204E may not be capable of causing the movement at velocity 302. As such, the robotic arm 200 may detect, during teach mode, a taught movement involving a velocity 302 that exceeds a velocity limit of the actuator in joint 204E. The robotic arm 200 may then responsively provide resistance indicating to the user 210 that this taught movement exceeds (or about to exceed) the velocity limit.

For instance, the robotic arm 200 may use the actuator in joint 204E to provide a torque 304 about axis 306, during teach mode, that counteracts the user 210's taught movement at velocity 302. In particular, the kinematic variable of the detected velocity 302 is mapped to a specific response torque 304. The robotic arm 200 may thus select the specific response torque 304 based on such mapping and responsively apply the torque 304 to generate resistance to the user 210's taught movement at velocity 302. In this manner, the resistance may encourage the user 210 to change the velocity of the movements during teach mode such that the robotic arm 200 can accurately carry out the task of wiping the surface during independent operation while staying away from the velocity limits. Other example scenarios may also be possible.

In another example implementation, the feedback is in the form of vibrational feedback. This feedback may be provided in addition to or alternatively to the resistance discussed above. More specifically, the amount of vibrational feedback may be constant regardless of the determined velocity (and/or acceleration). Alternatively, the amount of vibrational feedback may relate (e.g. be proportional) to the kinematic variable discussed above. This relationship may specifically involve mapping kinematic variables to vibration intensities provided by the actuator(s) 114 and/or by other vibration generating devices. For instance, the robotic system 100 may provide higher vibration intensities to faster movements during teach mode, such as for movements exceeding (or about to exceed) a velocity limit, while providing less (or no) vibration intensity to slower movements that stay away from the velocity limits or do not significantly exceed the velocity limits. Other example implementations and other forms of feedback may also be possible in relation to velocity/acceleration limits.

In another example, the robotic system 100 provides feedback related to torque (and/or force) limits of the robotic system 100. As noted above, the robotic system 100 may include actuator(s) 114, positioned at or near various joints, that may be configured to convert stored energy into movement of various movable component(s) 116 of the robotic system 100. Each such actuator may have limitations as to the amount of torque (or force) the actuator is capable of applying during independent operation of the robotic system 100. As such, the torque (and/or force) limits may correspond to limits of each actuator or may correspond to total torque (and/or force) limits of some (or all) of the actuators, among other possibilities.

In this example, the robotic system 100 provides feedback to the user at times, during teach mode, when user-instructed movements correspond to torques (and/or forces) that would exceed (or about to exceed) the limits if the robotic system 100 would apply these torques (and/or forces) while operating independently. In particular, the robotic system 100 may determine torques (and/or forces) during the user-instructed movements such as by using one or more force sensors. The robotic system 100 may then compare (e.g., continuously or from time-to-time) the determined torques (and/or forces) to the limits of the corresponding actuators.

In one case, the robotic system 100 may provide feedback in response to a torque (and/or force) being within a threshold of meeting the corresponding limit, such as when about to exceed the limit. In another case, the robotic system 100 may provide feedback in response to a torque (and/or force) exceeding the limit by any amount. In yet another case, the robotic system 100 may provide feedback in response to a torque (and/or force) exceeding the limit by at least a threshold amount. Other cases may also be possible.

In an example implementation, this feedback is in the form of resistance to user-instructed movements resulting in torques (and/or forces) exceeding the limits. This can be implemented in a similar manner to the resistance discussed above in association with velocity/acceleration limits. For instance, the amount of resistance may be constant regardless of the determined in torque (and/or force). Alternatively, the amount of resistance may relate (e.g. be proportional) to kinetic variable such as (i) the determined values of torque/force or (ii) an amount that the determined values exceed the limits or the thresholds discussed above. This relationship may specifically involve mapping kinematic variables to response torques provided by one or more of the actuator(s) 114 in order to resist the user-instructed movements.

In another example implementation, the feedback is in the form of vibrational feedback. This feedback may be provided in addition to or alternatively to the resistance discussed above. More specifically, the extent of vibrational feedback may be constant regardless of the determined torque (and/or force). Alternatively, the extent of vibrational feedback may relate (e.g. be proportional) to the kinetic variable discussed above. This relationship may specifically involve mapping kinetic variables to vibration intensities provided by the actuator(s) 114 and/or by other vibration generating devices. For instance, the robotic system 100 may provide higher vibration intensities to movements corresponding to torques that exceed (or about to exceed) a torque limit of an actuator, while providing less (or no) vibration intensity to movements that stay away from the torque limits or movements that do not significantly exceed the torque limits.

Figure 3B:
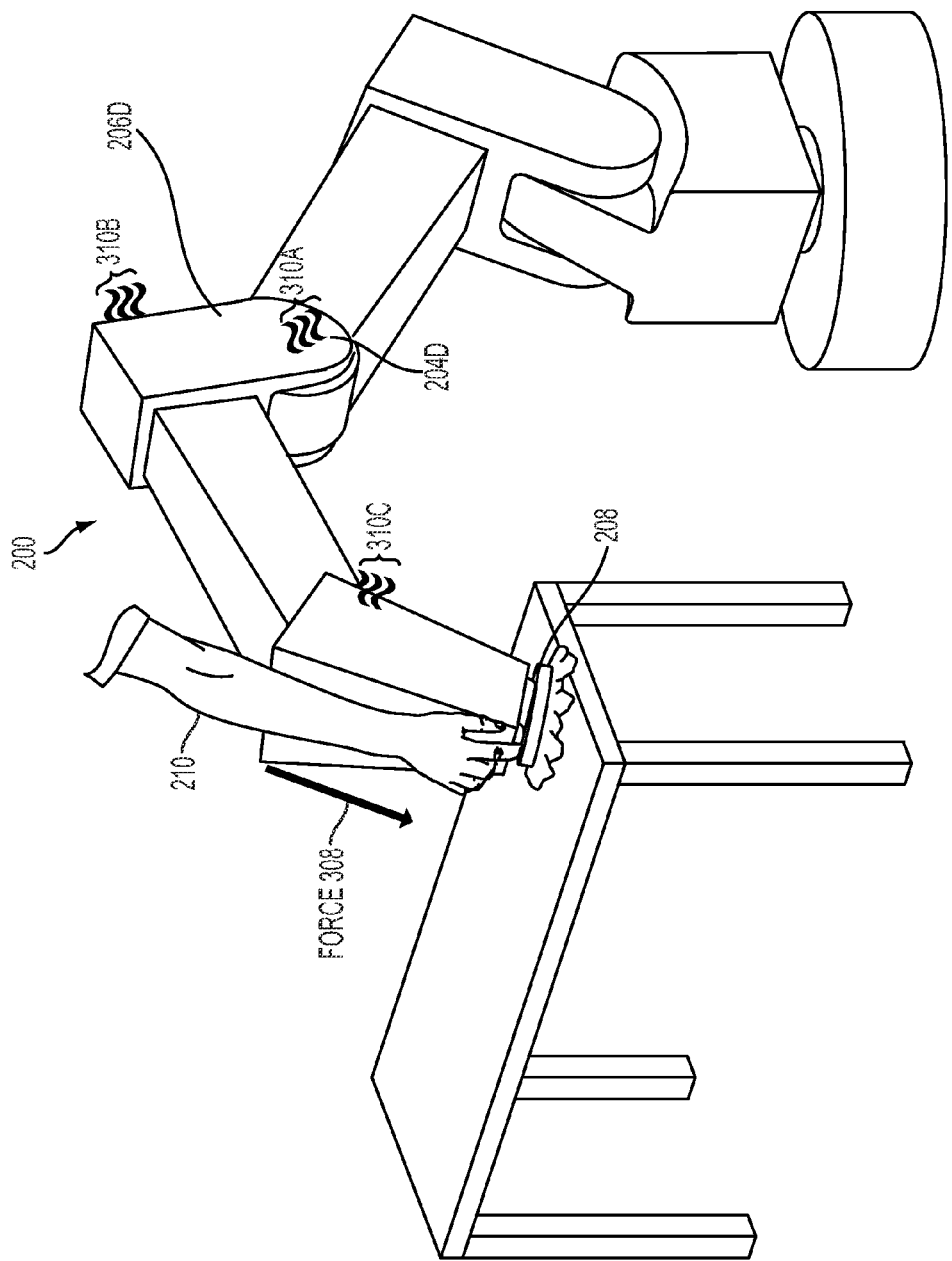
FIG. 3B illustrates second example feedback of the robotic arm during teach mode, according to an example implementation.

To illustrate, refer to FIG. 3B again depicting the scenario where the user 210 seeks to instruct the robotic arm 200 as to how to wipe the surface. This may specifically involve guiding the robotic arm 200 to apply specific forces onto the surface. In some cases, the user 210 may guide the robotic arm 200 to apply forces onto the surface that exceed the torques (e.g., in one or more of the actuators) that the robotic arm 200 is actually capable of independently generating in order to apply these forces onto the surface.

For example, user 210 is shown to move the robotic arm 200 such that a force 308 is applied onto the surface. In order to independently replicate this movement depicted in FIG. 3B, the robotic arm 200 may have to use an actuator in joint 204D in order to cause movement of appendage 206D among other movable component(s) 116. However, when the robotic arm 200 operates independently, the actuator in joint 204D may not be capable of generating a torque that results in application of force 308 onto the surface. As such, the robotic arm 200 may detect, during teach mode, a taught movement involving application of force 308 that exceeds a corresponding torque limit of the actuator in joint 204D. Such detection may be carried out using sensor data from force sensors positioned at the end effector 208, among other possibilities. The robotic arm 200 may then responsively provide vibrations indicating to the user 210 that this taught movement exceeds (or about to exceed) the torque limit.

For instance, the robotic arm 200 may use the actuators in joints 204D-204F to respectively generate vibrations 310A-310C during teach mode. In particular, the kinematic variable of the detected force 308 is mapped to specific vibration intensity. The robotic arm 200 may thus select the specific vibration intensity based on such mapping and responsively apply vibrations 310A-310C at the specific vibration intensity. Alternatively, different actuators may generate vibrations at different vibration intensities.

In one case (as shown), some (or all) of the actuators in the robotic arm 200 may be configured to responsively generate the vibrations. In another case, the actuator at which a torque limit is exceeded (e.g., the actuator at joint 204D) may be configured to responsively generate the vibrations. In yet another case, the actuator that is most proximate to the location at which the user 210 grabs onto the robotic arm 200 (e.g., the actuator at joint 204F) may be configured to responsively generate the vibrations. In this case, the system may receive information as to the location at which the user 210 grabs onto the robotic arm 200, such as from force sensors, position sensors, and/or proximity sensors, among others. Other cases may also be possible.

In either case, the vibrational feedback may encourage the user 210 to change the extent of applied force during teach mode such that the robotic arm 200 can accurately carry out the task of wiping the surface, when operating independently, while staying away from the torque limits. Other example implementations and forms of feedback may also be possible in relation to torque/force limits.

In yet another example, the robotic system 100 provides feedback related to a power limit of the robotic system 100. More specifically, the robotic system 100 may have limitations as to the amount of power that the robotic system 100 can use for various movements when operating independently. More specifically, this power limit may correspond to a limit in the amount of power used by one or more of the actuator(s) 114 to carry out user-instructed movements when operating independently, among other possibilities. These power limits may depend on actuator capabilities and/or may be set by a user or a manufacture, such as for the purpose of power saving. Information related to such limits can be obtained by the robotic system 100 from data storage 104 and/or from a remote server, among others.

In this example, the robotic system 100 provides feedback to the user at times, during teach mode, when user-instructed movements correspond to an amount of power that exceeds (or about to exceed) a power limit. In particular, the robotic system 100 may evaluate the user-instructed movements and determine an amount of power that the system would need to supply (e.g., using one or more of the power source(s) 112) in order to carry out such movements when operating independently. The robotic system 100 may then compare (e.g., continuously or from time-to-time) the determined power to the limits of the corresponding actuators.

In one case, the robotic system 100 may provide feedback in response to determined power being within a threshold of meeting the corresponding limit, such as when about to exceed the limit. In another case, the robotic system 100 may provide feedback in response to determined power exceeding the limit by any amount. In yet another case, the robotic system 100 may provide feedback in response to determined power exceeding the limit by at least a threshold amount. Other cases may also be possible.

In an example implementation, this feedback is in the form of resistance to such user-instructed movements. The amount of resistance may be constant regardless of the determined power. Alternatively, the amount of resistance may relate (e.g. be proportional) to variable such as (i) the determined values of power or (ii) an amount that the determined values exceed the limits or the thresholds discussed above. This relationship may specifically involve mapping variables to response torques provided by one or more of the actuator(s) 114 in order to resist user-instructed movements of one or more movable component(s) 116.

In another example implementation, the feedback is in the form of vibrational feedback. This feedback may be provided in addition to or alternatively to the resistance discussed above. More specifically, the amount of vibrational feedback may be constant regardless of the determined power. Alternatively, the amount of vibrational feedback may relate (e.g. be proportional) to the variables discussed above. This relationship may specifically involve mapping variables to vibration intensities provided by the actuator(s) 114 and/or by other vibration generating devices. For instance, the robotic system 100 may provide higher vibration intensities to movements, during teach mode, that involve exceeding a power limit, while providing less (or no) vibration intensity to movements that stay away from the power limits or do not significantly exceed the power limits. Other example implementations and forms of feedback may also be possible in relation to power limits.

In yet another example, the robotic system 100 provides feedback related to avoiding specific configurations of the robotic system 100 and/or encouraging specific configurations of the robotic system 100. For instance, the robotic arm 200 may have several degrees of freedom that allow the robotic arm 200 to move in various configurations during independent operation. However, while operating independently, some configurations may be impossible or undesirable for the robotic arm 200 to attain. In other words, the robotic arm 200 may have limitations regarding achieving some configurations and, for sake of simplicity, such configurations may be referred to as "undesirable" configurations.

In one case, the undesirable configurations may involve configurations corresponding to singularities of the robotic arm 200. The singularities may be caused by a collinear alignment of two or more axes and may result in unpredictable motion, among other undesirable outcomes. A specific example may include a joint singularity resulting in a gimbal lock. The gimbal lock configuration results from three axes of a robotic joint aligning in the same plane and thus restricting movement to two dimensions rather than allowing for movement in three dimensions. Note that singularities and gimbal lock configurations can also be avoided to help stabilize software code, among other possible advantages.

In another case, the undesirable configuration may involve other configurations that may be harmful to the system (and/or to the user 210), such as by potentially causing damage to components of the system, among other possible outcomes. In yet another case, the undesirable configuration may involve a configuration that decreases manipulability. Such a configuration result in a reduction in the number of possible configurations available to the robotic arm 200 for subsequent movement. Other cases may also be possible.

In this example, the robotic system 100 may provide feedback to the user 210 at times (i.e., during teach mode) when user-instructed movements result in such undesirable configurations and/or when the user-instructed movements direct movable component(s) 116 of the robotic system 100 towards such undesirable configurations. This feedback may be in the form of resistance and/or vibrations as discussed above, among other possibilities.

For instance, teaching the task of wiping the surface may specifically involve moving the robotic arm 200 in a specific sequence of configurations. The system may determine the configurations based on analysis of joint angles, among other possibilities. In some cases, the user 210 may move the robotic arm 200 towards undesirable configurations. For example, the system may determine that the movement is towards a configuration that decreases manipulability. As such, if the robotic arm 200 determines that the taught movements result in (or are directed towards) undesirable configurations, such as a movement towards a configuration corresponding to decreased manipulability, the robotic arm 200 may provide resistance and/or vibrational feedback. In this manner, the resistance and/or the vibrational feedback may encourage the user 210 to change the sequence of configurations during teach mode such that the robotic arm 200 can accurately carry out the task of wiping the surface during independent operation while staying away from undesirable configurations.

Note that feedback may also be provided to encourage the user 210 to move the robotic arm 200 towards desirable configurations. Such desirable configurations may include configurations that increase manipulability. That is, configurations that result in an increase in the number of possible configurations available to the robotic arm 200 for subsequent movement. Other examples may also be possible.

IV. SNAP-TO TEMPLATES

Figure 4:
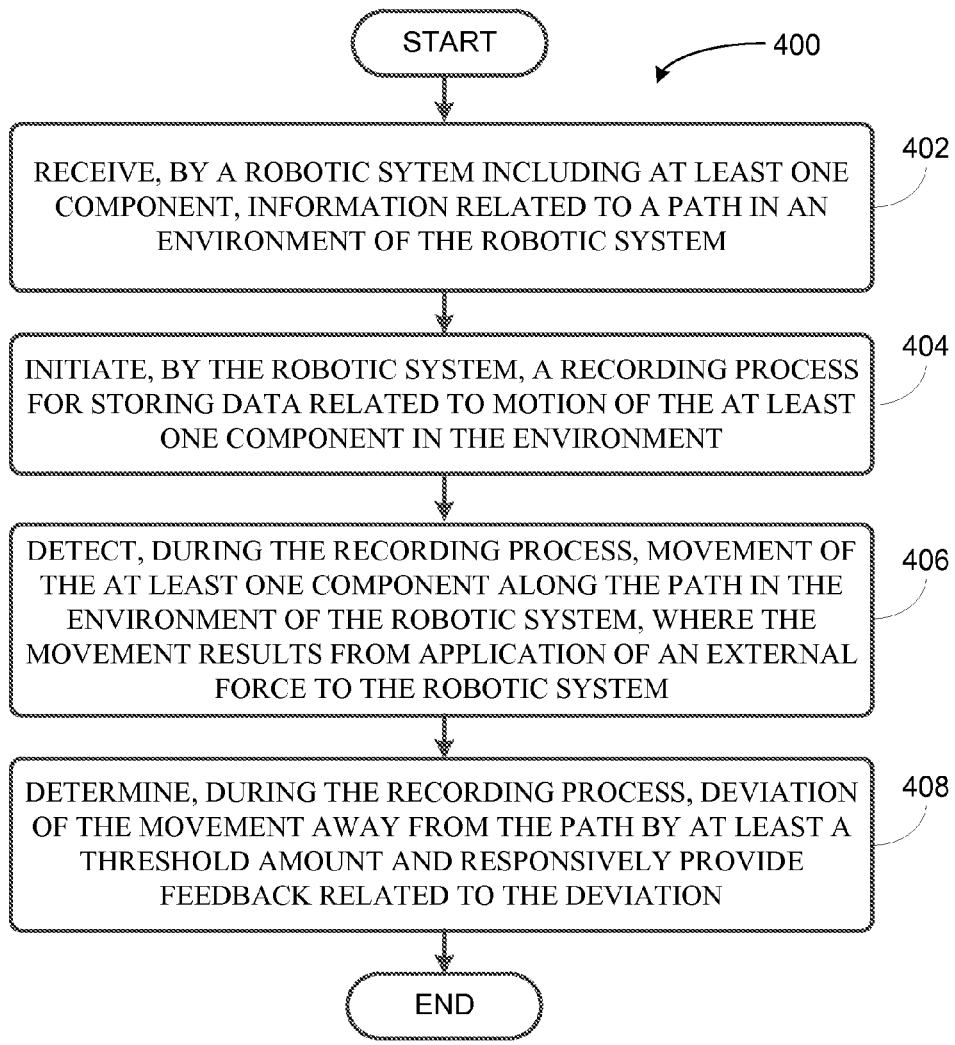
FIG. 4 is an example flowchart for providing feedback during teach mode, according to an example implementation.

In an example implementation, feedback may assist the user 210 to keep movement of the robotic system 100 within certain constraints as the user 210 instructs the robotic system 100 during teach mode. To illustrate, consider FIG. 4 showing an example method for providing feedback during teach mode. FIG. 4 is a flowchart illustrating a method 400, according to an example embodiment. Illustrative methods, such as method 400, may be carried out in whole or in part by a component or components in a robotic system, such as by the one or more of the components of the robotic system 100 shown in FIG. 1 or the robotic arm 200 shown in FIGS. 2A-2B. However, it should be understood that example methods, such as method 400, may be carried out by other entities or combinations of entities (i.e., by other computing devices and/or combinations of computing devices), without departing from the scope of the invention.

As shown by block 402, method 400 involves receiving, by a robotic system including at least one component (e.g., movable component(s) 116) and at least one actuator (e.g., actuator(s) 114), information related to a path in an environment of the robotic system.

As discussed above, a computing system may be coupled to the robotic system 100 and may be configured to receive input from the user 210, such as via a graphical user interface. For instance, the robotic system 100 may receive information and/or instructions, via the computing system, such as based on user-input at the graphical user interface. This may allow the user 210 to specify various constraints for the robotic system's operation during teach mode.

More specifically, the computing system allows the user 210 to select and/or construct templates via the graphical user interface. These templates may be referred to as "snap-to templates" and may correspond to various paths in the physical work space of the robotic system 100. Such a path may define a portion of the physical space (e.g., a course) along which a component may move in the physical space. For instance, the templates may correspond to a path of an end effector and/or path of an appendage, among other movable component(s) 116. Moreover, the templates may allow for guiding structured movements along particular paths as further discussed below.

In some cases, the templates may be predefined and may correspond to one of various paths along which a component may move in the physical space, such as a single point, several points, a grid, lines, circles, rectangles, surfaces, and regions, among other possibilities. Additionally or alternatively, the templates may be constructed based on user-input at the graphical user interface, thereby corresponding to a path in the environment of the robotic system 100 that may take on any shape or form as defined by the user 210.

In an example implementation, the graphical user interface may include a model of the environment at which the robotic system 100 is positioned. The model may be constructed based on sensor data from sensor(s) 110 of the robotic system 100 and/or from other sensors in the environment. Alternatively, the model may be constructed based on user-input at the graphical user interface, among other possibilities. Given the model of the environment, user-input may be used to position and/or orient a selected (or constructed) template within the model of the environment. In this manner, the robotic system 100 may receive information related to the path in the environment and may be configured to determine position and/or orientation of the path within a physical space.

In another example implementation, the graphical user interface may not include a model of the environment at which the robotic system 100 is positioned. In this implementation, the robotic system 100 may determine position and/or orientation of the path upon initiation of the recording process (e.g., teach mode) that is further discussed below in association with block 404. For instance, if the selected template corresponds to a line path, the robotic system 100 may select the starting position of the line as the initial position of the end effector in the physical space. Additionally, the robotic system 100 may select the orientation of the line in the physical space based on the initial user-instructed movement during teach mode. That is, the orientation of the line may correspond with the initial direction of the user-instructed movement of the end effectors. Other example implementations may also be possible.

In a further aspect, the robotic system 100 may also receive other information based on user-input at the graphical user interface of the computing system. For instance, the robotic system 100 may receive information related to user-specified limitations such as torque limits, force limits, power limits, velocity limits, acceleration limits, undesirable configurations, and/or desirable configurations. As such, the robotic system 100 may refer to the user-specified limitations during teach mode and provide feedback (e.g., in the manner discussed above) based on the user-specified limitations.

In some cases, the other received information may include selection of the movable component(s) 116 that should be associated with the selected template. For example, user-input may be received selecting the end effector as the component associated with the path in the environment. Upon such selection, the robotic system 100 may be configured to evaluate position (e.g., coordinates) of the end effector in the environment with the position (e.g., coordinates) of the path in the environment.

As shown by block 404, method 400 next involves initiating, by the robotic system, a recording process (e.g., operation in teach mode) for storing data related to motion of the at least one component in the environment. Note that, in some cases, receiving information related to the path may take place during the recording process.

As discussed above, the robotic system 100, such as robotic arm 200, may be capable of operating in a teach mode as illustrated by FIG. 2B. As discussed, teach mode may be an operating mode of the robotic system 100 that allows the user 210 to physically interact with and guide the robotic system 100 towards carrying out and recording various movements. The robotic system 100 may thus obtain data regarding how to carry out a specific task based on instructions and guidance from the user 210. This data may be stored in data storage 104 such that the robotic system 100 can refer to the data for carrying out the task independently at a later time.

Figure 5A:
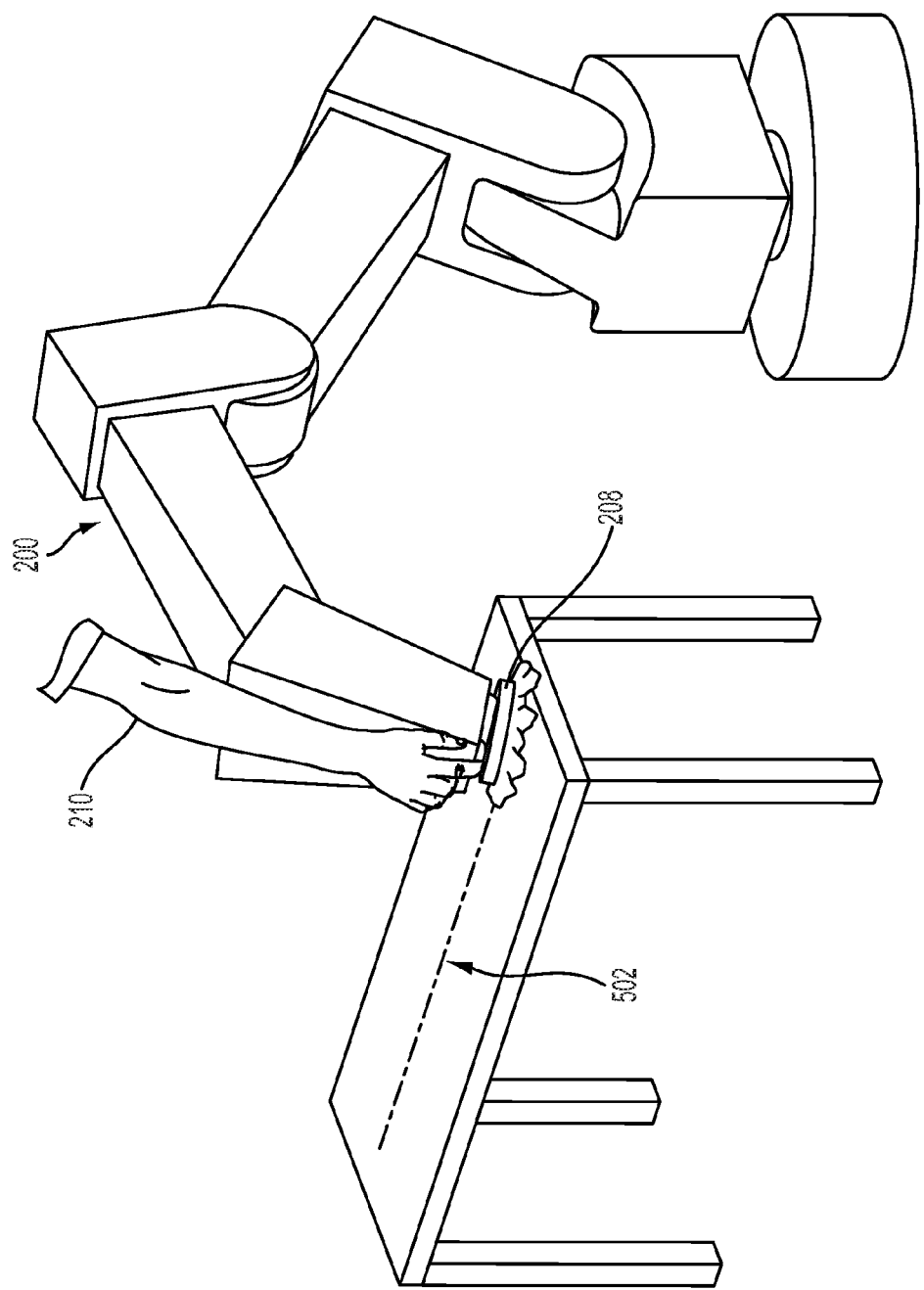
FIGS. 5A-5D illustrate a first example scenario where the robotic arm provides feedback during teach mode, according to an example implementation.

Upon selection of a snap-to template, the robotic system 100 may initiate the teach mode based on user-input received via the computing system and/or via the robotic system 100 (e.g., press of a button), among other possibilities. The user may then guide at least one movable component 116 of the robotic system 100 along the path corresponding to the snap-to template, such as for teaching a particular task. To illustrate, consider FIG. 5A depicting again the example scenario of instructing the robotic arm 200 regarding how to wipe the surface. FIG. 5A specifically illustrates the position of the end effector 208 when the recording process is initiated.

As illustrated, the snap-to template may be a template having a corresponding straight line path 502 in the environment of the robotic system 100. In particular, this straight line path 502 is shown as arranged along the surface. In this manner, the robotic arm 200 can record movement (i.e., during teach mode) of the end effector 208 along a straight line path 502 for the purpose of wiping the surface.

As shown by block 406, method 400 next involves detecting, during the recording process, movement of the at least one component along the path in the environment of the robotic system, where the movement results from application of an external force to the robotic system. Note that the robotic system 100 may be configured to provide haptic feedback, in the manner discussed above, for movement of the at least one component during teach mode.

Figure 5B:
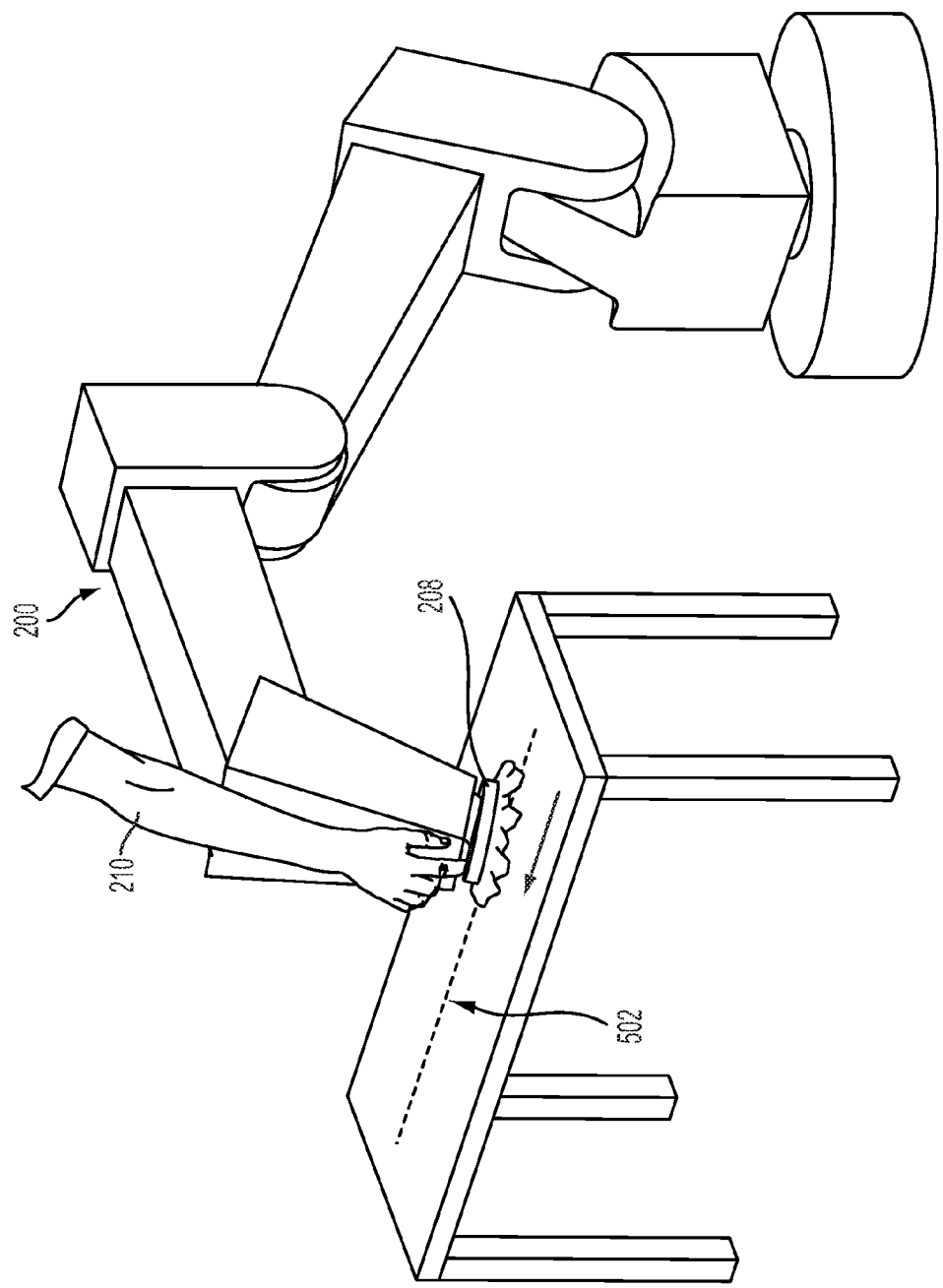

After initiation of teach mode, an external force may be applied by the user 210 that guides one or more movable component(s) 116 of the robotic system 100. For instance, as shown in FIG. 5B, the user 210 guides the end effector 208 along the straight line path 502. The robotic arm 200 may detect the movement by analyzing trajectory of the end effector 208, such as by determining position data (e.g., using position and/or proximity sensors) in the environment.

More specifically, the robotic arm 200 may evaluate position of the end effector 208 in the environment with respect to the straight line path 502 in the environment. For example, the robotic arm 200 may evaluate (e.g., continuously or from time-to-time) the coordinates of the end effector 208 in the physical space and compare the coordinates of the end effector 208 with the coordinates of the straight line path 502 in the physical space. The robotic arm 200 may then use the evaluation to detect movement of the end effector 208 along the straight line path 502 during teach mode. Detecting movement of the end effector 208 along the straight line path 502 may be carried out, for example, by detecting a match between coordinates of the end effector 208 and at least one coordinate related to the straight line path 502. Further, the robotic arm 200 may be configured to provide feedback, such as vibrational feedback, in response to detecting movement of the end effector 208 along the straight line path 502.

As shown by block 408, method 400 next involves determining, during the recording process, deviation of the movement away from the path by at least a threshold amount and responsively providing feedback related to the deviation. The feedback may include one or more of (i) resisting the deviation of the movement away from the path and (ii) guiding the at least one component back towards the path.

Figure 5C:
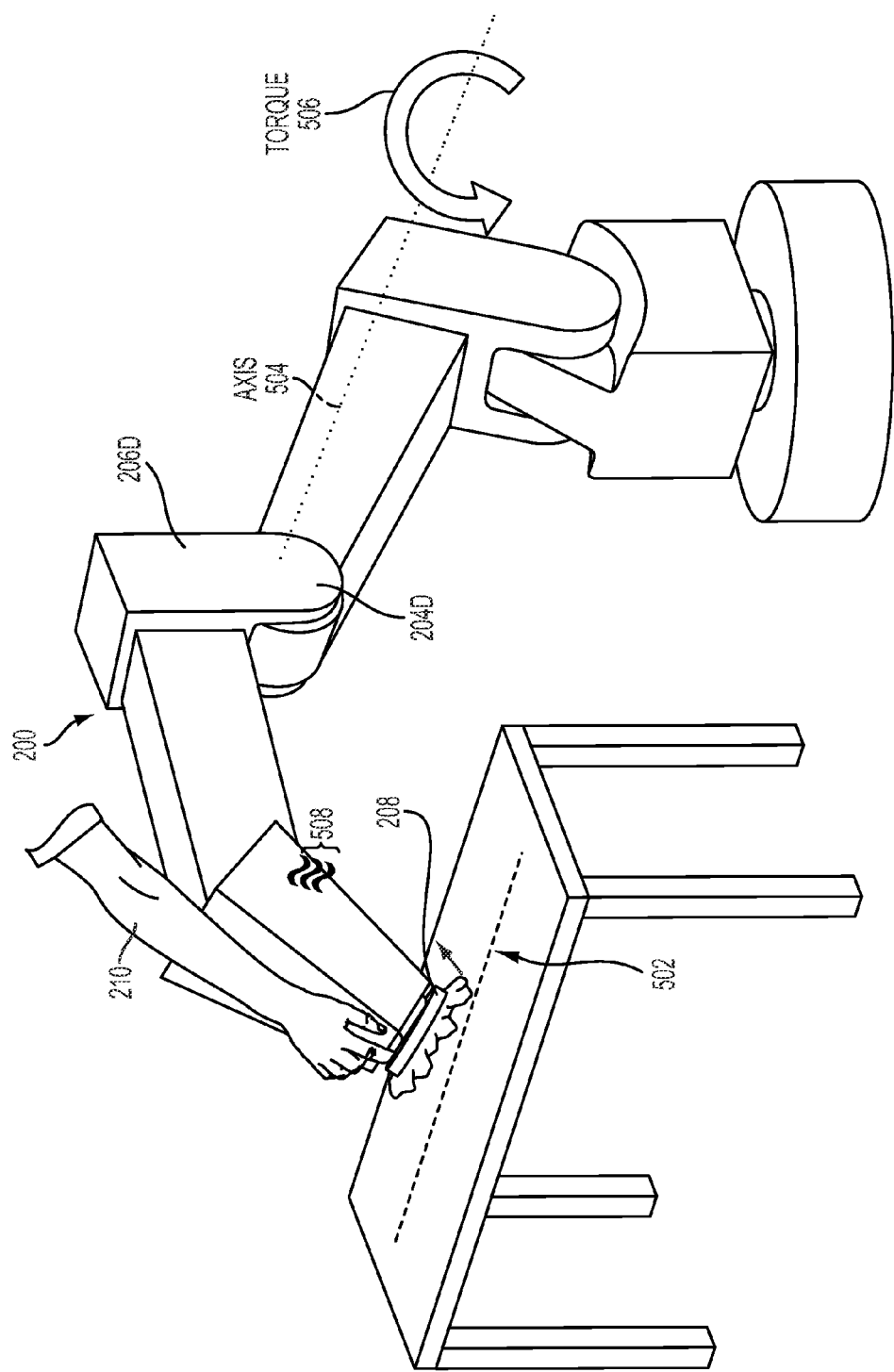

In an example implementation, the robotic system 100 is configured to determine, during teach mode, deviation of movement of a movable component 116 away from the path corresponding to the snap-to template. For instance, as shown in FIG. 5C, movement of the end effector 208 may deviate away from the straight line path 502 as a result of external force applied by the user 210. To determine the deviation, the robotic arm 200 may use the evaluation of the coordinates of the end effector 208 in the physical space.

More specifically, the robotic arm 200 compares the coordinates of the end effector 208 with the coordinates of the straight line path 502 in the physical space. In some cases, the robotic arm 200 may determine that the coordinates of the end effector 208 do not match with at least some coordinates along the straight line path 502. In this case, the robotic arm 200 may determine a distance in physical space between the coordinates of the end effector 208 and a coordinate along the straight line path 502 such as the coordinate that is most proximate to the coordinates of the end effector 208.

Subsequently, the robotic arm 200 may determine whether the determined distance exceeds a threshold distance corresponding to a deviation by a threshold amount. In one case, the threshold distance may be zero. That is, the robotic arm 200 may be configured to determine deviation by any amount. In another case, the threshold distance may be a non-zero distance such as two meters, for example. In either case, the robotic arm 200 may be configured to provide feedback in response to determining deviation by at least the threshold amount. The robotic arm 200 may provide this feedback to the user 210 to encourage the user 210 to guide the robotic arm 200 along the straight line path 502.

In one example, the feedback is in the form of resistance to the deviation of the movement away from the path. The robotic arm 200 may use one or more of the actuator(s) 114 to apply one or more torques that resist the external force, applied by the user 210, causing the deviation away from the straight line path 502. For instance, the robotic arm 200 may use the actuator in joint 204D to provide a torque 506 about axis 504, during teach mode, which counteracts the user 210's taught movement causing the deviation. The extent of applied torque 506 for resisting the deviation may be enough to indicate the deviation to the user 210. However, the extent of the applied torque 506 may be such that movement along the straight line path 502 is not entirely rigid. That is, the extent of the applied torque 506 may allow for at least some deviation away from the straight line path 502.

In some implementations, the extent of the applied torque may be proportional to the amount of deviation. In particular, the variable of the detected distance is mapped to a specific response torque. The robotic arm 200 may thus select the specific response torque based on such mapping and responsively apply the torque to generate resistance to the user 210's taught movement causing the deviation.

The mapping may take on various forms. In one instance, the extent of the applied torque 506 may increase as the extent of the deviation increases. In another instance, the amount of deviation can be mapped to the response torque to provide feedback in the form stiffness and/or damping, among other possibilities. As an example, stiffness is a measure of resistance offered by an elastic body to deformation. In an example implementation, the mapping may involve a relationship between the stiffness, the extent of applied force by the user 210, and/or the determined distance (e.g., displacement). In this implementation, the stiffness of the movable component may be set such that specific applied forces result in specific amounts of deviation, thereby providing a feedback in a form corresponding to some degree of stiffness.

In this manner, the resistance may encourage the user 210 to change direction of the movements during teach mode such that the robotic arm 200 can accurately carry out the task of wiping the surface during independent operation in the way that the user 210 intended (e.g., staying along or in the vicinity of the straight line path 502).

In another example, the robotic arm 200 provides vibrational feedback in response to determining the deviation. For instance, as shown in FIG. 5C, the robotic arm 200 may provide vibrations 508 using the actuator in joint 204F. In some cases, the vibrational feedback may be proportional to the amount of the deviation. That is, the variable of the detected distance is mapped to specific vibration intensity. The robotic arm 200 may thus select the vibration intensity for vibrations 508 based on such mapping and responsively apply the vibrations 508 to provide feedback regarding the user 210's taught movement causing the deviation.

In yet another example, the feedback is in the form of guiding the component back towards the path. More specifically, the robotic arm 200 may evaluate position of the end effector 208 relative to position of the straight line path 502 and determine at least one trajectory (and/or direction) that would allow the end effector 208 to deviate back to the straight line path 502. The robotic arm 200 may then use one or more of the actuator(s) 114 to apply one or more torques that guide the end effector 208 back to the straight line path 502. The guidance may be along the determined trajectory (and/or in the determined direction), among other possibilities.

Figure 5D:
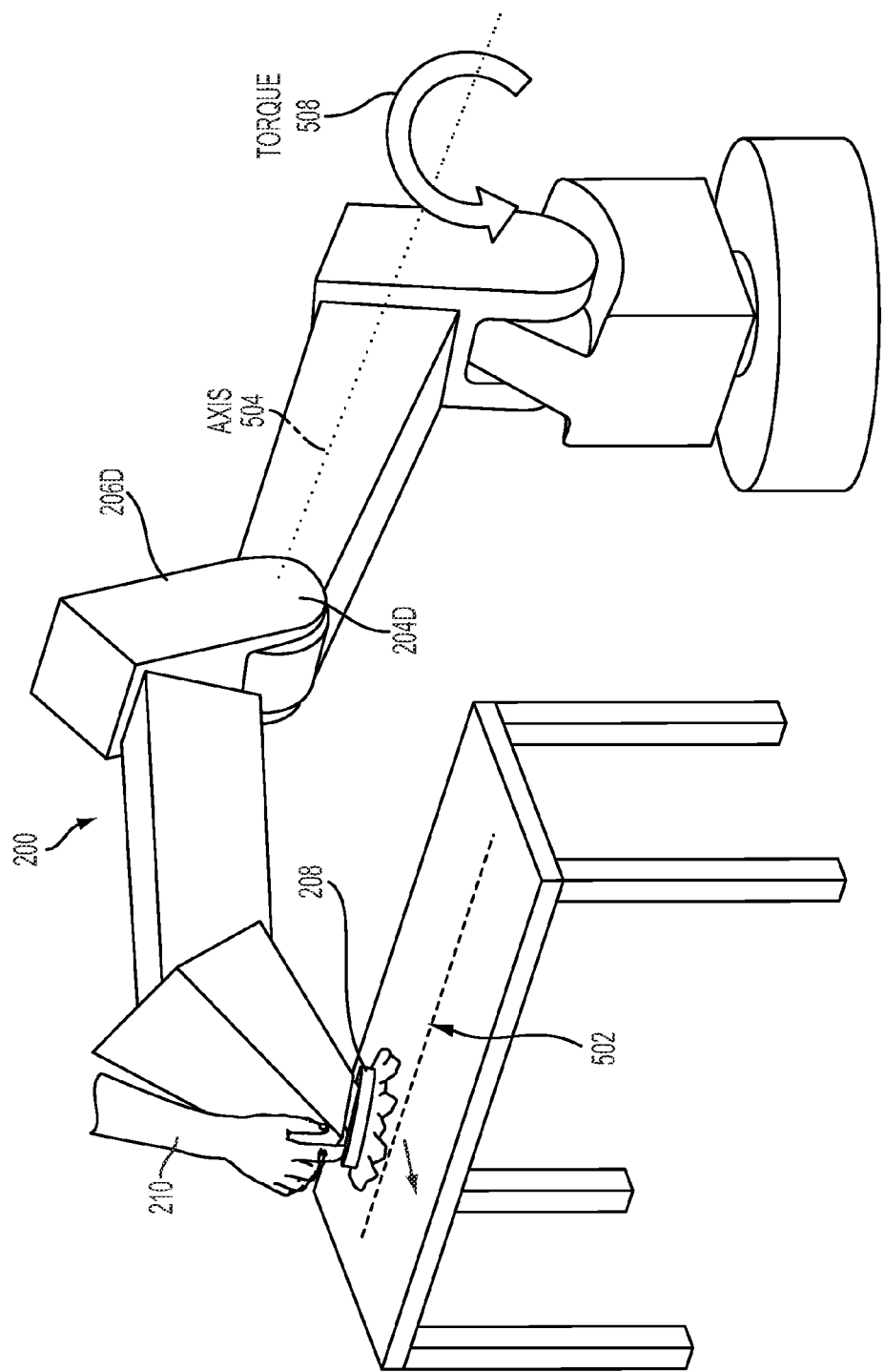

For instance, as shown in FIG. 5D, the robotic arm 200 may use the actuator in joint 204D to provide a torque 508 about axis 504, during teach mode, which guides the end effector 208 back towards the straight line path 502. This torque 508 may be the same as or may be different from the torque 506 provided for the purpose of resistance to the deviation as discussed above. For instance, feedback in the form of stiffness may be used for resistance as well as guidance towards the path.

In either case, the extent of applied torque 508 may be enough to provide an indication to the user 210 of the trajectory/direction that would allow the end effector 208 to return to movement along the straight line path 502. However, the extent of the applied torque 508 may be such that movement of the robotic arm 200, when deviation has been determined, is not entirely rigid. That is, the extent of the applied torque 508 may allow the user 210 to maintain the deviation away from the straight line path 502 if a sufficient external force is applied.

Additionally, if application of the external force is ceased (e.g., the user 210 lets go of the robotic arm 200), the robotic arm 200 may independently cause the end effector 208 to deviate back towards the straight line path 502 during teach mode. That is, the robotic arm 200 may apply one or more torques that cause the end effector 208 to return to a position along the straight line path 502. Once the robotic arm 200 independently causes the end effector 208 to return, the robotic arm 200 may cease any further movement until an external force is again applied by the user 210.

Further, the robotic arm 200 may continue applying the torque 508 until a determination is made that the movement again involves movement of the end effector 208 along the straight line path 502. Upon determination that the movement again involves movement of the end effector 208 along the straight line path 502, the robotic arm 200 may cease application of torques used for the purpose of guiding the end effector 208 back towards the straight line path 502. Moreover, upon determination that the movement again involves movement of the end effector 208 along the straight line path 502, the robotic arm 200 may provide feedback (e.g., vibrational feedback) indicating that the end effector 502 has returned to movement along the straight line path 502.

Providing feedback by way of resistance and/or guiding the component back towards the path may exhibit to the user 210 a form of "magnetic attraction" of the component to the path corresponding to the snap-to template. As such, the component may essentially seek to "snap to the template" during teach mode, thereby allowing the user 210 to guide the robotic arm 200 within specified constraints for an intended task.

In a further aspect, the robotic system 100 may be configured to select, construct, and/or refine snap-to templates, during teach mode, based on various parameters. These parameters may include the information provided by the user 210 via the computing system (and/or via buttons/tactile input integrated within the robotic system) such as user-selected templates, user-specified limitations, and/or user specification of the intended task, among others. Additionally or alternatively, the parameters may include data collected by the robotic system 100 during teach mode. Based on the parameters, the robotic system 100 may update the path in the environment (or may specify points/segments of interest along the path) and may responsively provide additional/updated feedback during teach mode based on the updated path (or based on the specified points/segments).

To illustrate, consider FIGS. 6A-6D depicting an example scenario for teaching the robotic arm 200 a task involving installation of bolts in a circular bolt-hole pattern 602. In this example scenario, the robotic arm 200 may receive information such as selection of a snap-to template corresponding to a circular path 604 in the physical space. This information may include specification of the radius (or diameter) of the circular path 604 such that path in the physical space can correspond to the circular bolt-hole pattern 602.

Additionally, the robotic arm 200 may receive information related to user specification of the intended task. In one example, user-input may be received specifying that the intended task involves installation of bolts. In another example, the robotic arm 200 may receive instructions to store data related to specific positions along the circular path 604 that can be marked in response to user-input. That is, as the user 210 moves the robotic arm 200 along the circular path 502 during teach mode, user-input may be received (e.g., via the computing system or via buttons integrated in the robotic system) denoting that a position of the end effector 208 along circular path 604 corresponds to a position of a bolt in the bolt-hole pattern 602. In this manner, the robotic arm 200 can determine positions corresponding to bolts when operating independently and subsequently install the bolt using the end effector 208. The installation may be based on built-in instructions in the robotic arm 200 and/or based on user instructions provided to the robotic arm 200 during teach mode.

Figure 6A:
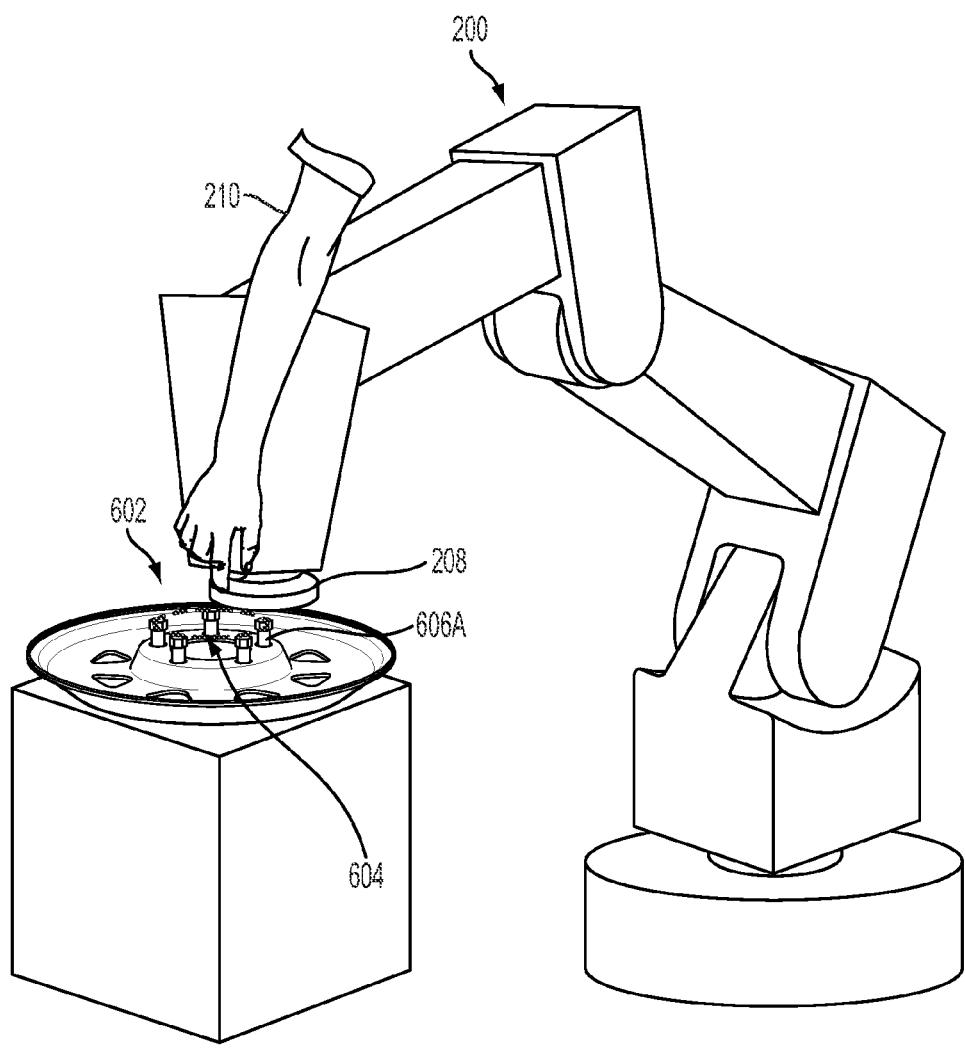
FIGS. 6A-6D illustrate a second example scenario where the robotic arm provides feedback during teach mode, according to an example implementation.

As shown in FIG. 6A, the end effector 208 is positioned in the vicinity of the circular path 604 during teach mode. In particular, the user 210 may position the end effector 208 above a first bolt 606A. User-input may then be received specifying location of the first bolt 606A along the circular path 604. In some cases, the robotic system may provide acknowledgment to the user-input by providing some feedback, such as vibrational feedback for example. At this point, the robotic arm 200 may have information related to location of the first bolt 606A but does not yet have information related to locations of the remaining bolts.

Figure 6B:
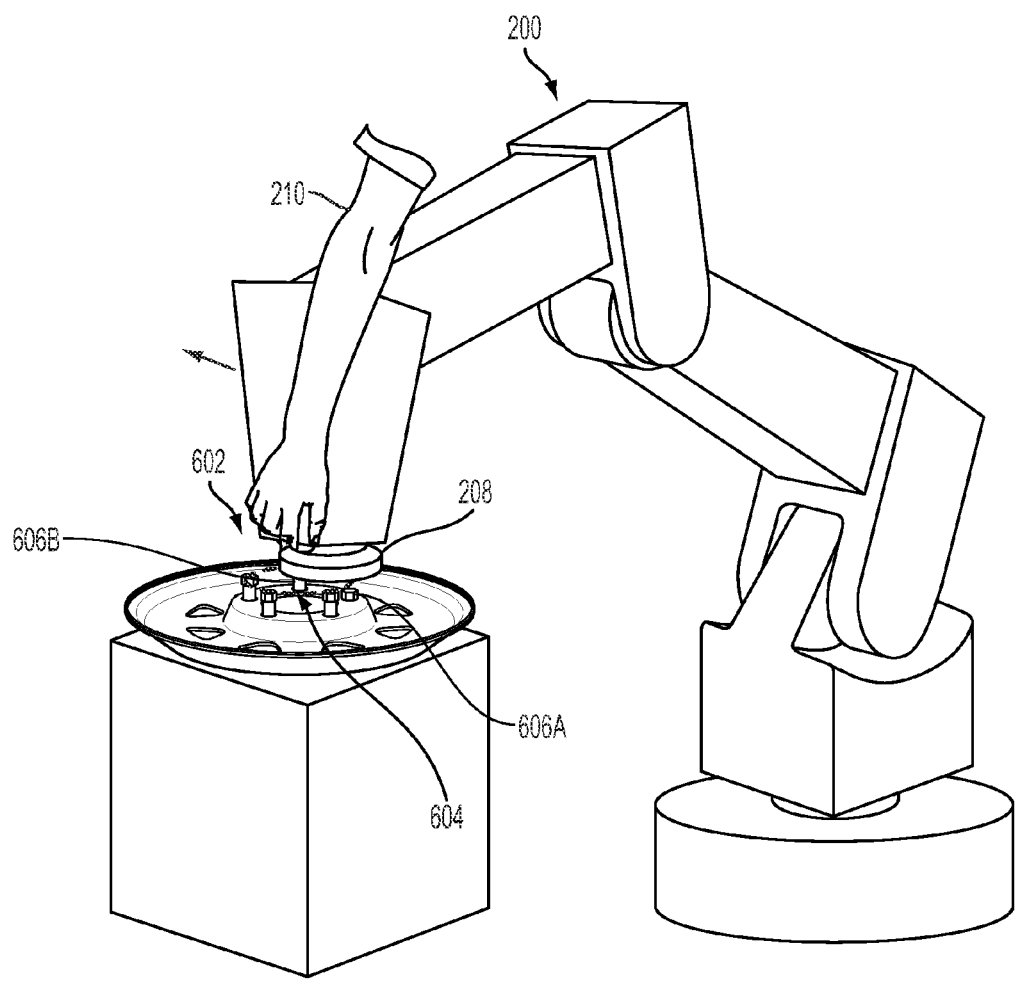

As shown in FIG. 6B, the first bolt 606A is installed and user-instructed movement causes movement of the end effector 208 along the circular path 604 towards the second bolt 606B. The user 210 may position the end effector 208 above a second bolt 606B and user-input may then be received specifying location of the second bolt 606B along the circular path 604. At this point, the robotic arm 200 may have information related to locations of the first bolt 606A and the second bolt 606B.

In an example implementation, the robotic arm 200 may refine the snap-to template related to the circular path 604 based on various parameters such as the information related to locations of the first bolt 606A and the second bolt 606B. More specifically, the robotic arm 200 may be configured to determine locations of the remaining bolts and refine the template to guide further movements of the end effector 208 towards the vicinity of the remaining bolts.

To determine locations of the remaining bolts, the robotic arm 200 may use the information related to locations of the first bolt 606A and the second bolt 606B along the circular path 604 while predicting that the bolt locations follow a pattern, such as by being positioned along equidistant points along the circular path 604. As such, the robotic arm 200 may determine the distance along the circular path 604 from the first bolt 606A to the second bolt 606B. Alternatively, the robotic arm 200 may determine the angular displacement along the circular path 604 from the first bolt 606A to the second bolt 606B.

Subsequently, the robotic arm 200 may use the determined distance (or the determined angular displacement) to determine location of the third bolt and so on. In one example, location of the third bolt is determined as at a distance away from the second bolt 606B, along the circular path 604, which is the same as the determined distance from the first bolt 606A to the second bolt 606B. In another example, location of the third bolt is determined as at an angular displacement away from the second bolt 606B, along the circular path 604, which is the same as the angular displacement from the first bolt 606A to the second bolt 606B. Other examples may also be possible.

Figure 6C:
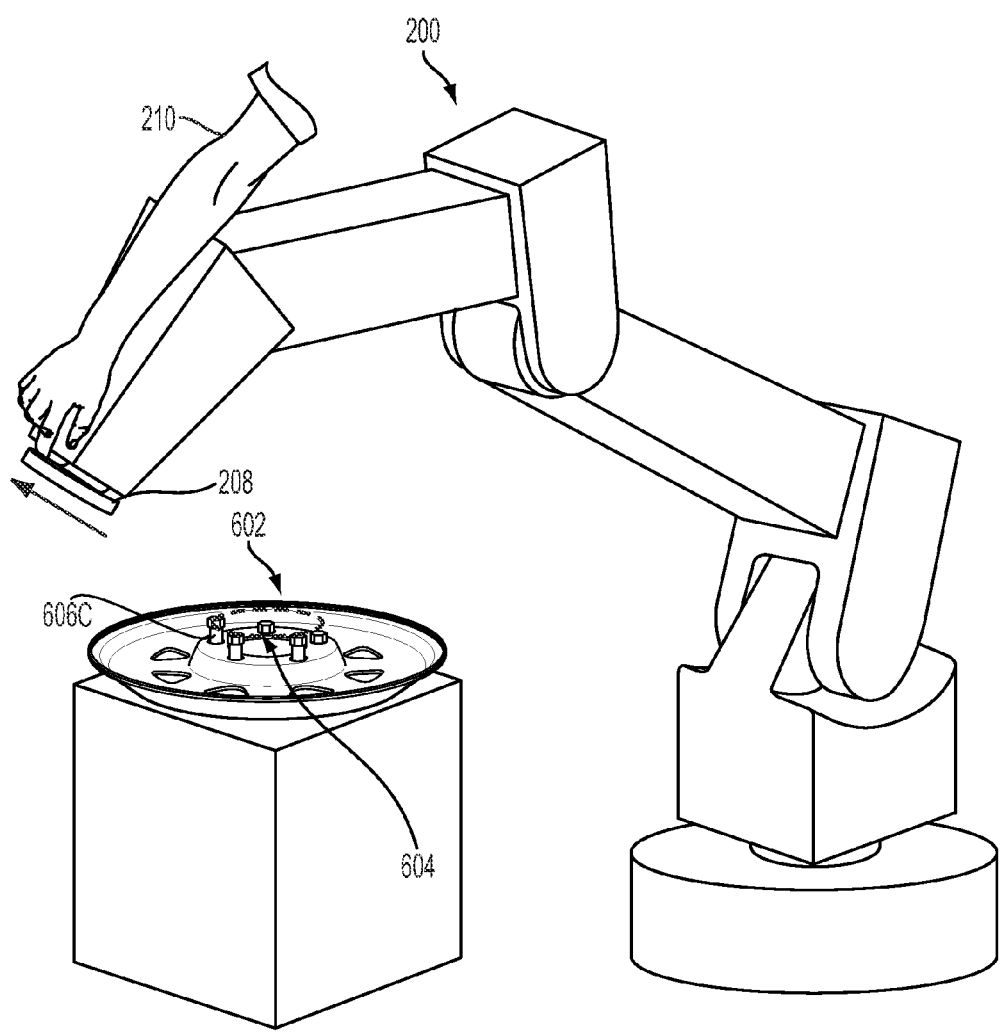

After determining locations of the remaining bolts, the robotic arm 200 refines the template to guide further movements of the end effector 208 towards the vicinity of the remaining bolts. For example, FIG. 6C depicts deviation of the end effector 208 away from the circular path 604. Upon determining deviation away from the circular path 504, the robotic arm 200 may use the techniques discussed above to provide feedback (e.g., resistance and/or guidance) to encourage the user 210 to position the end effector 208 back along the circular path 504. More specifically, the robotic arm 200 may provide feedback to encourage the user 210 to position the end effector 208 in the vicinity of the third bolt 606C in the circular bolt-hole pattern 602.

Figure 6D:
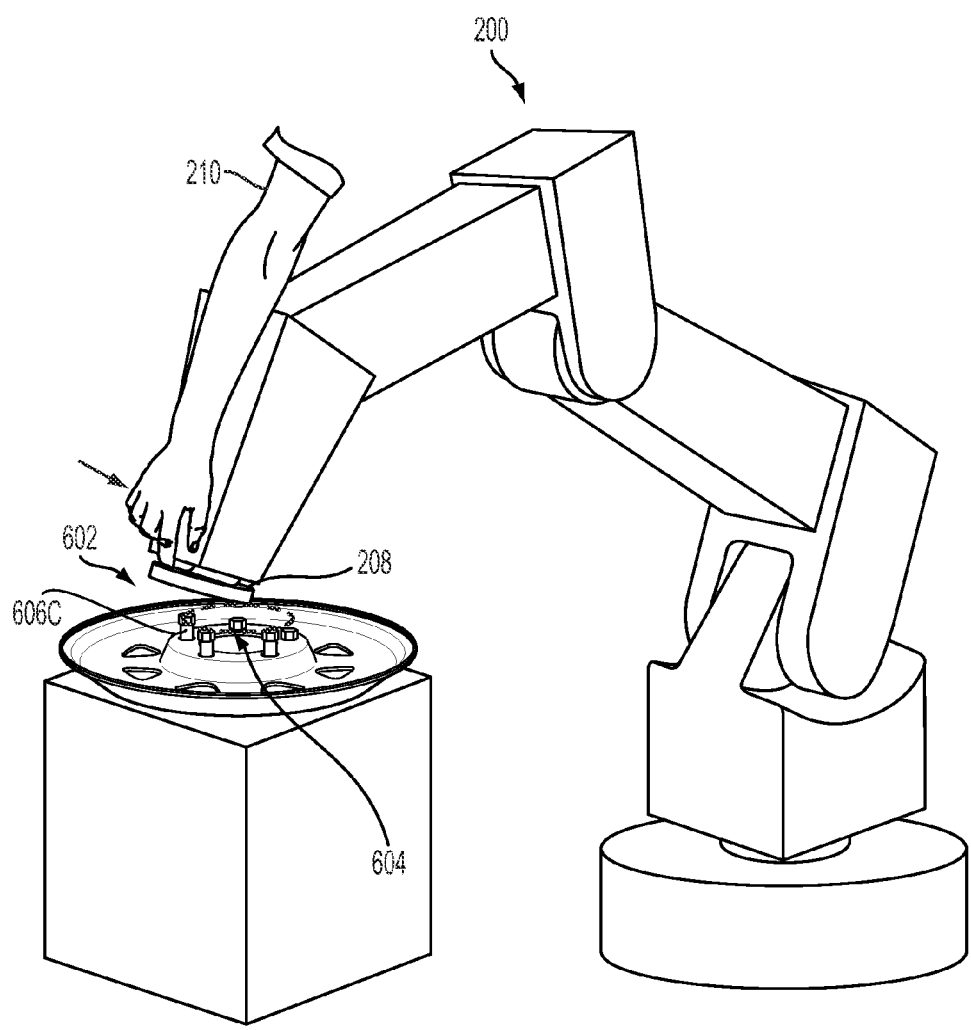

As shown in FIG. 6D, the end effector 208 is deviating back towards the third bolt 606C along circular path 604 during teach mode. Once the end effector 208 is positioned in the vicinity of the third bolt 606C (e.g., within a threshold distance), the robotic arm 200 may provide additional feedback. For instance, the robotic arm 200 may provide vibrational feedback (e.g., a series of vibrations) indicating the end effector 208 is positioned in the vicinity of the third bolt 606C. Other examples and illustrations may also be possible without departing from the scope of the disclosure.

In a further aspect, the above techniques may also be used in a collaborative mode where a user and the robotic system each carry out different operations and motions to execute a task. For instance the robotic system may control specific motions and forces during normal operation while the user may control other motions and forces when the robotic system operates during normal operation. Referring to the bolt-hole example above, a user may screw in a first bolt and a second bolt while the robotic system support the weight of the tools and guides the user to the remaining bolts. The user may then work to screw in the bolts to which the robotic system guides the user.

V. CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

We claim:

1. A method comprising:
   receiving, by a robotic system comprising at least one component and at least one actuator, information related to a path in an environment of the robotic system;
   initiating, by the robotic system, a recording process for storing data related to motion of the at least one component in the environment;
   detecting, during the recording process, movement of the at least one component along the path in the environment of the robotic system, wherein the movement results from application of an external force to the robotic system; and
   determining, during the recording process, deviation of the movement away from the path by at least a threshold amount and responsively providing feedback related to the deviation, wherein providing the feedback comprises providing a force using the at least one actuator of the robotic system.

2. The method of claim 1, wherein providing the feedback further comprises resisting the deviation of the movement away from the path by providing the force using the at least one actuator of the robotic system.

3. The method of claim 1, wherein providing the feedback further comprises guiding the at least one component back towards the path by providing the force using the at least one actuator of the robotic system.

4. The method of claim 1, wherein the provided force is proportional to an extent of the deviation.

5. The method of claim 1, wherein the at least one actuator has a corresponding velocity limit, the method further comprising:
   determining, during the recording process, that the movement of the at least one component corresponds to movement of the at least one actuator at a velocity exceeding the velocity limit; and
   in response to determining that the movement of the at least one component corresponds to movement of the at least one actuator at a velocity exceeding the velocity limit, providing a force, using the at least one actuator, for resisting movement of the at least one actuator at the velocity exceeding the velocity limit.

6. The method of claim 1, wherein the at least one actuator has a corresponding force limit, the method further comprising:
   determining, during the recording process, that the movement of the at least one component corresponds to application of a force exceeding the force limit; and
   in response to determining that the movement of the at least one component corresponds to application of a force exceeding the force limit, providing vibrational feedback.

7. The method of claim 1, wherein application of the external force to the robotic system is received through a teaching input.

8. A non-transitory computer readable medium having stored therein instructions executable by one or more processors to cause a robotic system to perform functions, the robotic system including a plurality of components and at least one actuator, the functions comprising:
   receiving information related to a path in an environment of the robotic system;
   initiating a recording process for storing data related to motion of the plurality of components in the environment;
   detecting, during the recording process, movement of at least one component, from the plurality of components, along the path in the environment of the robotic system, wherein the movement results from application of an external force to the robotic system; and
   determining, during the recording process, deviation of the movement away from the path by at least a threshold amount and responsively providing feedback comprising guiding the at least one component back towards the path by providing a force using the at least one actuator of the robotic system.

9. The non-transitory computer readable medium of claim 8, wherein guiding the at least one component back towards the path by providing the force comprises providing the force until a subsequent determination is made that the movement again involves movement of the at least one component along the path.

10. The non-transitory computer readable medium of claim 8, wherein the at least one component has a corresponding velocity limit, the functions further comprising:
    determining, during the recording process, that the movement of the at least one component involves movement of the at least one component at a velocity exceeding the velocity limit; and
    in response to determining that the movement of the at least one component involves movement of the at least one component at a velocity exceeding the velocity limit, providing a force, using the at least one actuator, for resisting movement of the at least one component at the velocity exceeding the velocity limit.

11. The non-transitory computer readable medium of claim 8, wherein the robotic system further comprises a plurality of actuators, and wherein the plurality of actuators have a corresponding total force limit, the functions further comprising:
    determining, during the recording process, that the movement of the at least one component corresponds to application of a total force exceeding the total force limit; and
    in response to determining that the movement of the at least one component corresponds to application of a total force exceeding the total force limit, providing vibrational feedback.

12. The non-transitory computer readable medium of claim 8, wherein the at least one actuator comprises a plurality of actuators, and wherein the plurality of actuators have a corresponding total power limit, the functions further comprising:
  determining, during the recording process, that the movement of the at least one component corresponds to application of a total power exceeding the total power limit; and
  in response to determining that the movement of the at least one component corresponds to application of a total power exceeding the total power limit, providing vibrational feedback.

13. The non-transitory computer readable medium of claim 8, wherein the at least one component has a corresponding acceleration limit, the functions further comprising:
  determining, during the recording process, that the movement of the at least one component involves acceleration exceeding the acceleration limit; and
  in response to determining that the movement of the at least one component involves acceleration exceeding the acceleration limit, providing vibrational feedback.

14. The non-transitory computer readable medium of claim 8, wherein the data related to motion of the plurality of components in the environment comprises one or more of: velocity data, acceleration data, torque data, power data, trajectory data, and joint position data.

15. A robotic device comprising:
  at least one actuator;
  at least one component; and
  a controller configured to:
    receive information related to a path in an environment of the robotic device;
    initiate a recording process for storing data related to motion of the at least one component in the environment;
    detect, during the recording process, movement of the at least one component along the path in the environment of the robotic device, wherein the movement results from application of an external force to the at least one component;
    determine, during the recording process, deviation of the movement away from the path by an amount that exceeds a threshold amount; and
    in response to determining deviation of the movement away from the path by an amount that exceeds a threshold amount, providing feedback comprising resisting the deviation of the movement away from the path by providing a force using the at least one actuator.

16. The robotic device of claim 15, wherein the controller is further configured to:
  determine, during the recording process, that the deviation comprises deviation towards a configuration of the robotic device that reduces a number of possible configurations available to the robotic device for subsequent movement; and
  in response to determining that the deviation comprises deviation towards a configuration of the robotic device that reduces a number of possible configurations available to the robotic device for subsequent movement, provide vibrational feedback.

17. The robotic device of claim 15, wherein the at least one component has a corresponding velocity limit, wherein the controller is further configured to:
  determine, during the recording process, that the movement of the at least one component involves movement of the at least one component at a velocity exceeding the velocity limit; and
  in response to determining that the movement of the at least one component involves movement of the at least one component at a velocity exceeding the velocity limit, provide vibrational feedback.

18. The robotic device of claim 17, wherein the vibrational feedback is proportional to an extent of the velocity exceeding the velocity limit.

19. The robotic device of claim 15, wherein the at least one component has a corresponding acceleration limit, and wherein the controller is further configured to:
  determine, during the recording process, that the movement of the at least one component involves acceleration exceeding the acceleration limit; and
  in response to determining that the movement of the at least one component involves acceleration exceeding the acceleration limit, provide a force, using the at least one actuator, for resisting movement of the at least one component at the acceleration exceeding the acceleration limit.

20. The robotic device of claim 15, wherein the controller is further configured to, during the recording process, receive parameters related to updates to the path and responsively update the path based on the received parameters.

\* \* \* \* \*